United States Patent
Mitsunaga et al.

(10) Patent No.: US 7,808,738 B2
(45) Date of Patent: Oct. 5, 2010

(54) INFORMATION STORAGE APPARATUS FOR ADJUSTING FLYING HEIGHT OF HEAD

(75) Inventors: Nobuyuki Mitsunaga, Kawasaki (JP); Noriaki Takemura, Higashine (JP)

(73) Assignee: Toshiba Storage Device Corporation, Tokyo (JP)

( * ) Notice: Subject to any disclaimer, the term of this patent is extended or adjusted under 35 U.S.C. 154(b) by 0 days.

(21) Appl. No.: 12/212,238

(22) Filed: Sep. 17, 2008

(65) Prior Publication Data

US 2009/0097151 A1    Apr. 16, 2009

(30) Foreign Application Priority Data

Oct. 11, 2007    (JP) ............................. 2007-265218

(51) Int. Cl.
*G11B 21/02* (2006.01)
(52) U.S. Cl. ...................................... 360/75
(58) Field of Classification Search ....................... None
See application file for complete search history.

(56) References Cited

U.S. PATENT DOCUMENTS

| | | | | |
|---|---|---|---|---|
| 5,994,866 A | * | 11/1999 | Kisaka et al. | 318/607 |
| 6,011,666 A | * | 1/2000 | Wakamatsu | 360/69 |
| 6,067,203 A | * | 5/2000 | Ottesen et al. | 360/73.03 |
| 7,088,545 B1 | * | 8/2006 | Singh et al. | 360/75 |
| 7,212,361 B1 | * | 5/2007 | Pederson et al. | 360/31 |
| 7,480,115 B2 | * | 1/2009 | Hiroyuki et al. | 360/75 |
| 7,492,543 B2 | * | 2/2009 | Mitsunaga et al. | 360/75 |
| 7,508,616 B2 | * | 3/2009 | Fitzpatrick et al. | 360/75 |
| 7,605,996 B2 | * | 10/2009 | Baumgart et al. | 360/75 |
| 7,630,160 B2 | * | 12/2009 | Kurita et al. | 360/69 |

FOREIGN PATENT DOCUMENTS

| | | |
|---|---|---|
| JP | A 7-262726 | 10/1995 |
| JP | A 2002-150744 | 5/2002 |
| JP | A 2006-107722 | 4/2006 |

* cited by examiner

*Primary Examiner*—K. Wong
(74) *Attorney, Agent, or Firm*—Greer, Burns & Crain, Ltd.

(57) ABSTRACT

A storage apparatus including a motor for rotating a medium and a head that has a heater. The clearance between the medium and the head is controlled by expansion of the head by the heater. Some embodiments could include a monitor configured to monitor atmospheric pressure, and a controller configured to control the heater in accordance with the atmospheric pressure so as to control the clearance. Some embodiments could include a monitor configured to monitor a driving current flowing through the motor, and a controller configured to control the heater in accordance with the driving current so as to control the clearance.

13 Claims, 24 Drawing Sheets

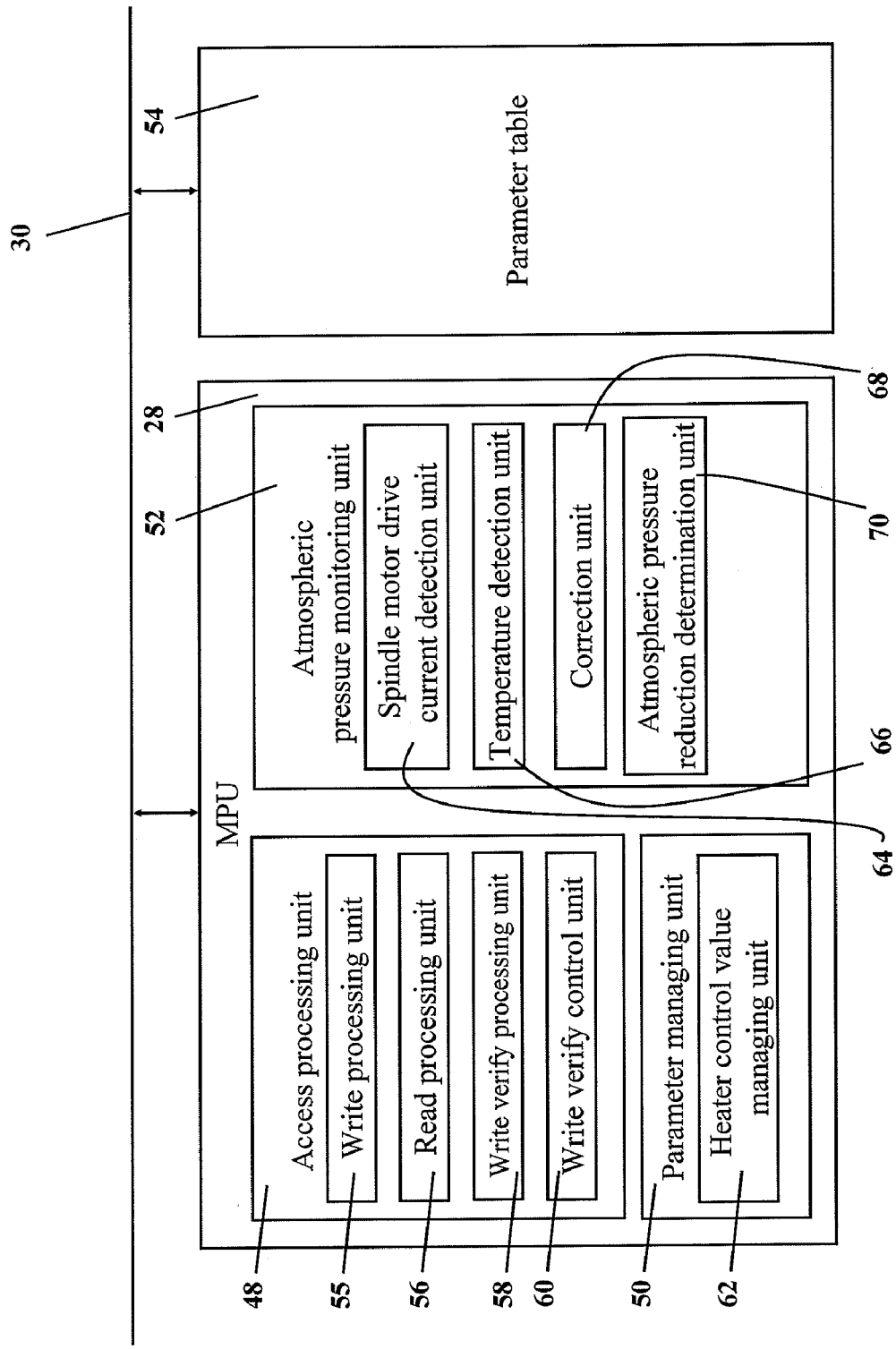

FIG. 3A 54-1

| Head number | Heater control value | |
|---|---|---|
| | Base heater control value | Adjustment heater control value |
| HH1 | B1 | R1 |
| HH2 | B2 | R2 |
| HH3 | B3 | R3 |
| HH4 | B4 | R4 |

FIG. 3B

| Reduced atmospheric pressure threshold value | Temperature correction factor | Source voltage correction factor |
|---|---|---|
| Ith | K1 | K2 |

54-2

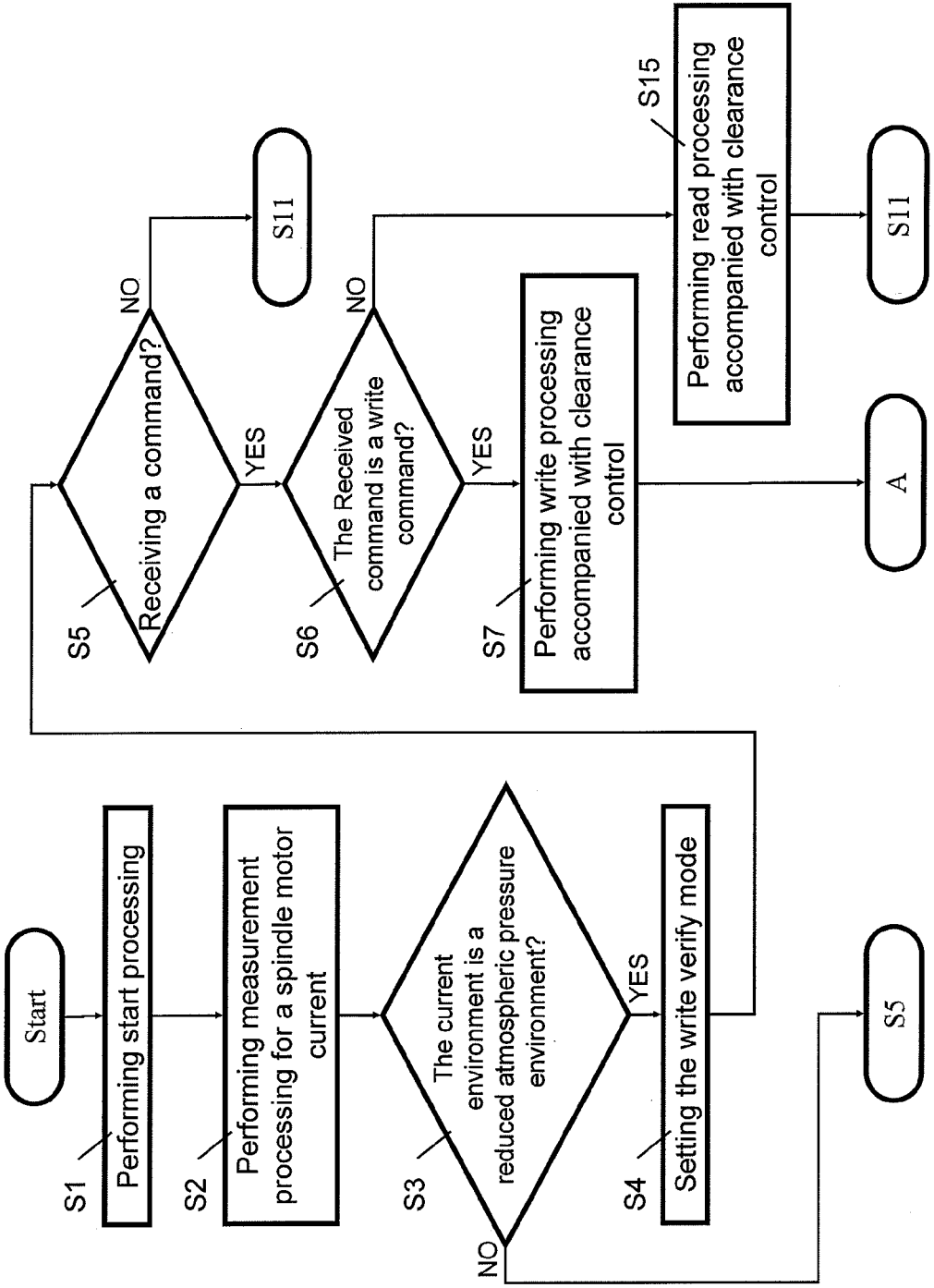

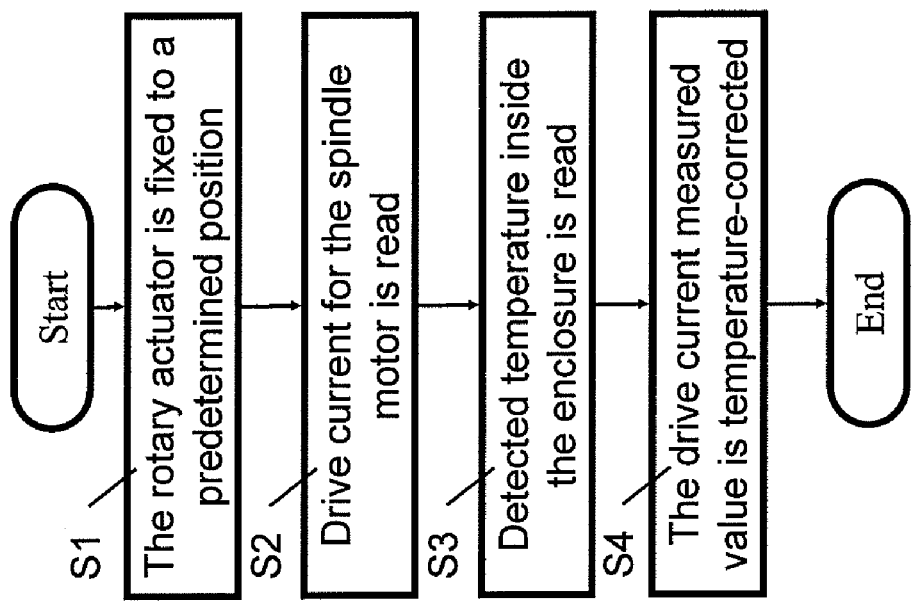

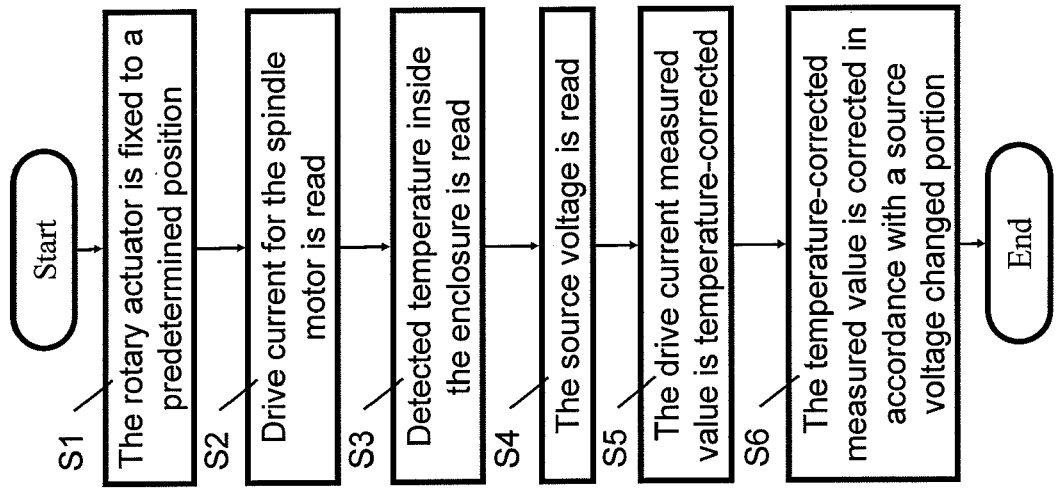

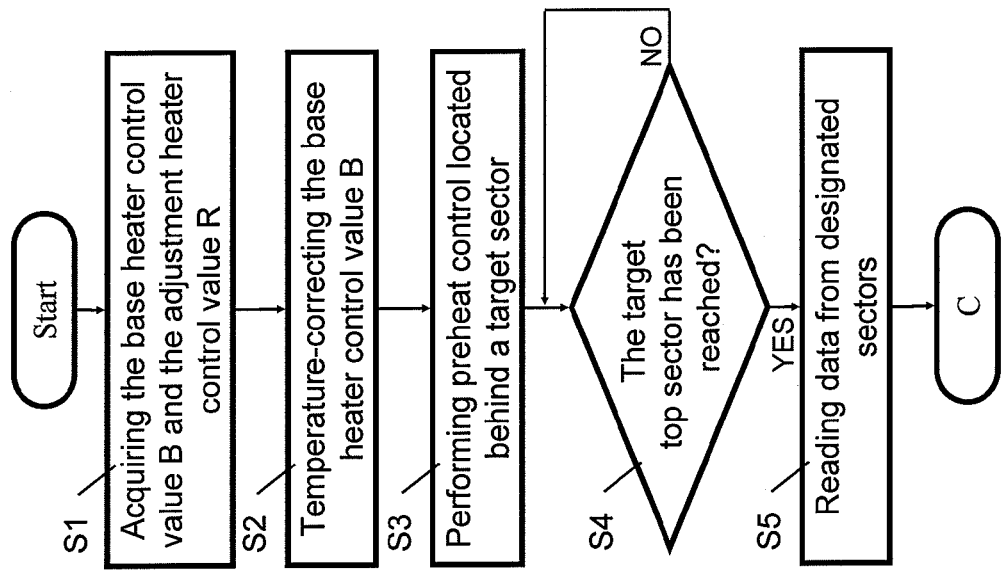

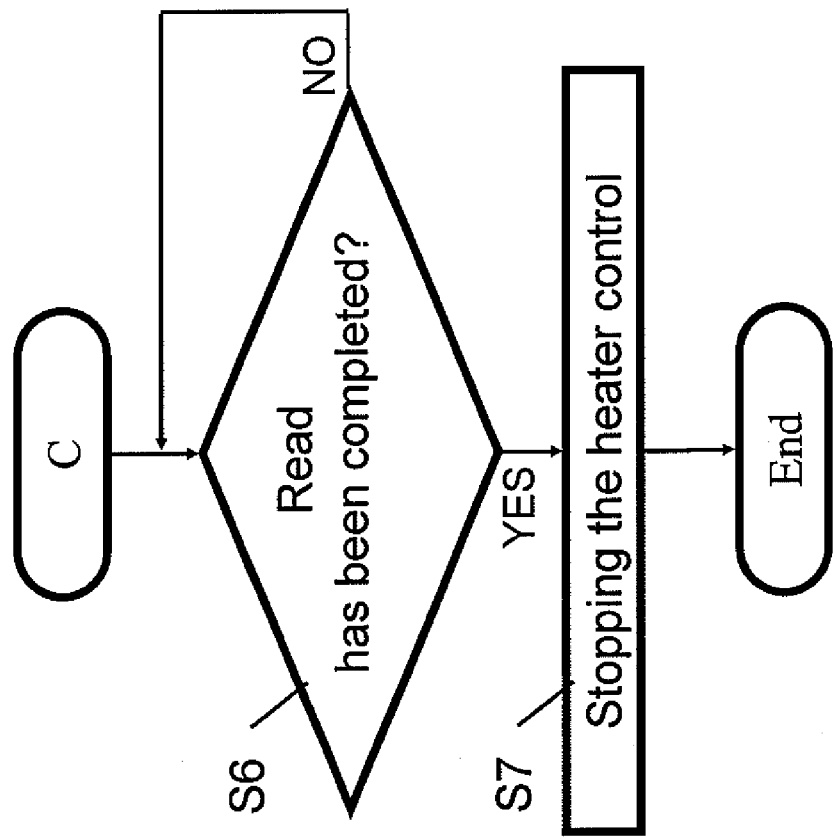

INFORMATION STORAGE APPARATUS FOR ADJUSTING FLYING HEIGHT OF HEAD

BACKGROUND

The present technique relates to a storage apparatus and a storage control circuitry for reading/writing data by causing a head to fly above a rotating storage medium. The present technique pertains to a storage apparatus and storage control circuitry capable of appropriately addressing the reduction in clearance between the head and a storage medium under an environment of reduced atmospheric pressure.

In order to realize a high recording density of a magnetic disk device, to reduce the clearance (spacing) between an element part of the head and a recording surface of the magnetic disk is necessary. Hence, the clearance generated by the flying of the head above the storage medium has been designed to be constant by taking advantage of the pressure of air (positive pressure/negative pressure) flowing between a slider having the magnetic head and the magnetic recording medium.

In order to enhance the recording density, the distance between the head and the medium must be reduced. Hence, the clearance between the head and the medium has been decreased with a tendency toward a higher recording density. Eventually the clearance has been reduced down to several nm, by controlling the clearance between the head and the recording medium surface utilizing thermal expansion accompanying electric heating of a heater provided to the head.

In such a method in which the clearance between the head and the magnetic recording surface is controlled by providing the heater to the head, there is no problem as long as under a normal usage environment. However, once the magnetic disk has been installed in an environment of reduced atmospheric pressure, for example, installed at a highland, the clearance may decrease to thereby bring the head and magnetic disk into contact. As a result, there occurs a possibility that data to be written may not correctly recorded into the magnetic disk, and hence that the data recorded in the magnetic disk cannot be correctly read.

In order to avoid such a failure under a usage environment of reduced atmospheric pressure, the design of the shape of a head floating surface or the setting of energization amount to the heater is performed so that the clearance becomes one in which the decrement in clearance due to atmospheric pressure decrease is added to the clearance under a normal atmospheric pressure (1 atm) beforehand in manufacturing process. With such a countermeasure used, however, the clearance under a normal atmospheric pressure, which is high in usage frequency, becomes too large, thereby causing a situation of increasing an error rate.

Techniques of the related art are disclosed in Japanese Laid-open Patent Publication No. 7-262726, Japanese Laid-open Patent Publication No. 2002-150744 and Japanese Laid-open Patent Publication No. 2006-107722.

SUMMARY

An aspect of an embodiment, a storage apparatus has a motor for rotating a medium, a head for writing data into or reading data from the medium, the head having a space control element for changing a flying height of the head over the medium and a controller for controlling the space control element so as to control the flying height of the head and the medium when writing data into or reading data from the medium, for monitoring a value of a driving current flowing through the motor, for detecting an error by comparison of data written into the medium and data read out from the medium, and for changing the flying height of the head by controlling the space control element in accordance with the monitored driving current when an error is detected.

BRIEF DESCRIPTION OF THE DRAWINGS

FIG. 2 is a block diagram showing details of functional construction of the MPU in FIG. 1;

FIGS. 3A and 3B are representations each showing a parameter table used in the present embodiment;

FIGS. 13A and 13B are flowcharts showing control processing in the present embodiment including clearance control by a heater;

FIG. 14 is a flowchart showing measurement processing of spindle motor derive current;

FIG. 15 is a flowchart showing other measurement processing of spindle motor derive current;

FIGS. 17A and 17B are flowcharts showing read processing;

DESCRIPTION OF THE PREFERRED EMBODIMENTS

Figure 1:
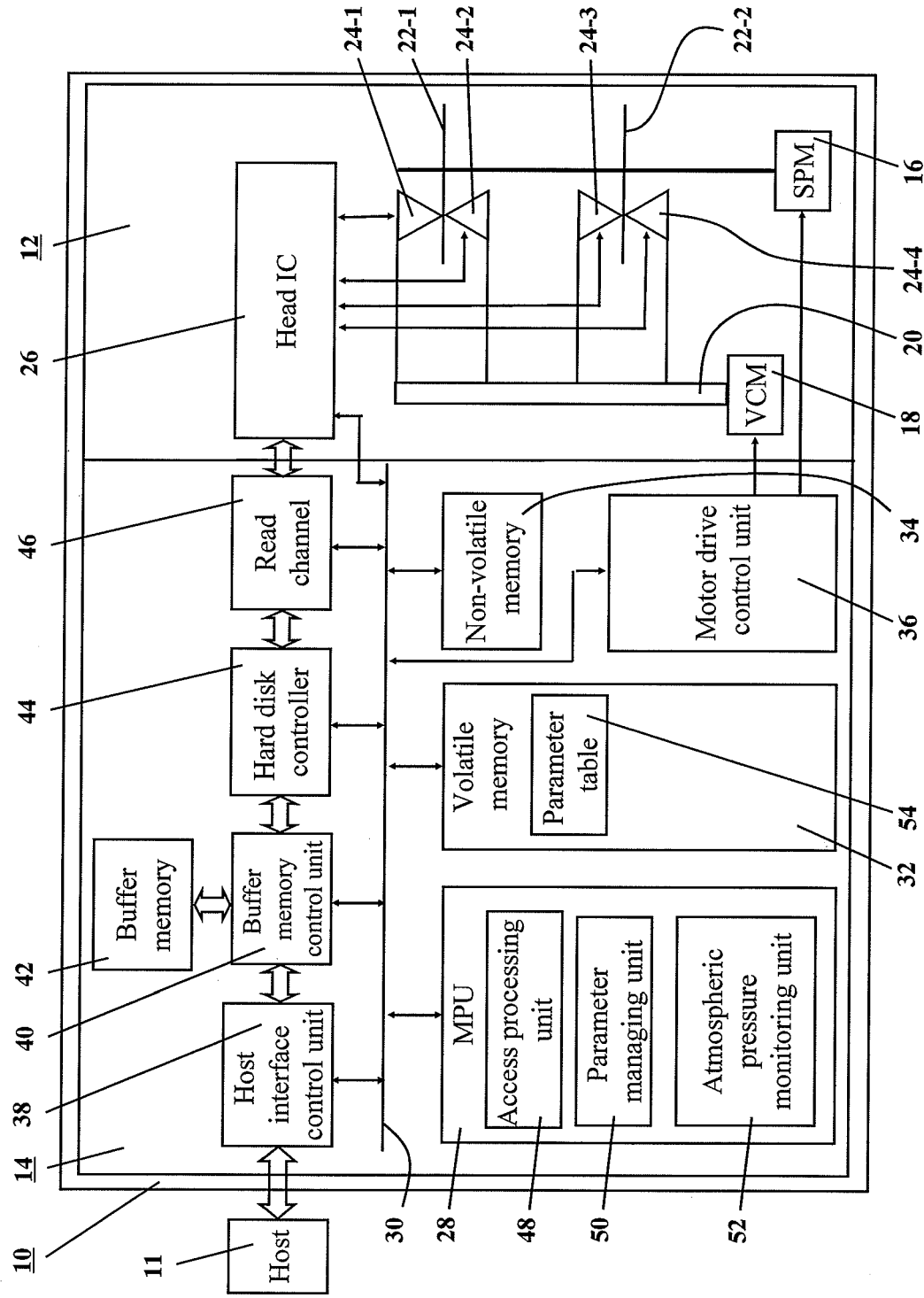
FIG. 1 is a block diagram of a magnetic disk device as an embodiment of a storage device according to the present technique.

FIG. 1 is a block diagram of a magnetic disk device as an embodiment of a storage device according to the present technique. In FIG. 1, a magnetic disk device 10 known as a hard disk drive (HDD) is composed of a disk enclosure 12 and a control board 14.

A spindle motor 16 is provided in the disk enclosure 12. Magnetic disks 22-1 and 22-2 are mounted onto a rotating shaft of the spindle motor 16 and rotated at a fixed rotating speed of 4200 rpm for example.

A voice coil motor 18 is provided in the disk enclosure 12. The voice coil motor 18 drives rotary actuators 20 to perform positioning with respect to recording surfaces of the magnetic disks 22-1 and 22-2, the rotary actuators 20 mounting heads 24-1 to 24-4 at arm front-end parts thereof.

The heads 24-1 to 24-4 constitute a composite head in which recording elements and writing elements are integrated. For reading elements, in-plane magnetic recording type recording elements, or vertical magnetic recording type recording elements are used. In the case of the vertical magnetic recording type recording elements, for the magnetic disks 22-1 and 22-2, vertical magnetic recording media having recording layers and back magnetic layers of soft magnetic material are used. For reading elements, GMR elements or TMR elements are employed.

The heads 24-1 to 24-4 according to the present embodiment each incorporate a heater, and the clearances between recording surfaces of the magnetic disks 22-1 to 22-2 and respective heads are controlled by expansion of the heaters through electric heating thereof. The head has a space control element for changing a flying height of the head over a medium for storing data.

The heads 24-1 to 24-4 are connected to a head IC 26 by signal lines. And the head IC 26 selects one of the heads according to a head select signal based on a write command or a read command from a host 11 serving as a higher-level device, to thereby perform writing or reading. Moreover, in the head IC 26, a write driver is provided for a write system. And a pre-amplifier is provided for a read system.

The head IC 26 also incorporates a D/A converter for controlling heaters provided in the heads. The D/A converter converts a heater control value from the control board 14 into a drive current and delivers the drive current to the heaters in the heads, thereby controlling the clearances trough thermal expansion.

An MPU 28 is provided in the control board 14, and, with respect to a bus 30 of the MPU 28, there are provided a volatile memory 32 that loads firmware including a control program and control data, and a non-volatile memory 34 that stores firmware using flash ROM or the like and parameters necessary for control.

In addition, with respect to the bus 30 of the MPU 28, there are provided a motor drive control unit 36, a host interface control unit 38, a buffer memory control unit 40 that controls a buffer memory 42, a hard disk controller 44, a read channel 46 that functions as a write modulation unit and a read modulation unit.

Herein, the MPU 28, the volatile memory 32, the non-volatile memory 34, the host interface control unit 38, the buffer memory control unit 40, the hard disk controller 44, and the read channel 42 are implemented as storage control circuitry mounted in a single LSI.

Other than the above-described embodiment in which the circuitry is mounted in a single LSI, the hard disk controller 44 or the read channel 46 or the like may be mounted in another LSI, and for this purpose, they may be constituted by storage control circuitry including a controller such as the MPU 28.

The magnetic disk device 10 performs writing processing and reading processing based on commands from the host 11. Normal operations in the magnetic disk device will be described below.

When a write command and write data from the host 11 is received by the host interface control unit 38, the write command is decoded by the MPU 28, and the received write data is stored in the buffer memory 42 as required. Then, the received write data is converted into a predetermined data format by the hard disk controller 40, and after an ECC code has been added thereto by ECC processing, scrambling, RLL code conversion, and further write compensation are performed in the write modulation system in the read channel 46. Thereafter, the write data is written from the recording element of a selected head 24-1 for example, onto the recording surface of the magnetic disk 22-1, via the head IC 26 from the write amplifier.

At this time, a head positioning signal has been given to the motor drive control unit 36 by the MPU 28, and after a target track that is specified by the command has been sought, the head is caused to be placed on the track by the voice coil motor 18 to thereby perform track following control.

On the other hand, when a read command from the host 11 is received by the host interface control unit 38, the read command is decoded by the MPU 28, and read signals read from the reading element of the head selected by head selection of the head IC 26 are amplified by the pre-amplifier. Then, the read signals are inputted to the read demodulation system of the read channel 46, and after the read signals have been subjected to an automatic gain amplification, a noise cut by a low-pass filter, an A/D conversion, and an automatic equalization by a FIR filter, the read data is demodulated by partial response maximum likelihood (PRML) detection or the like. Thereafter, the read data is subjected to an RLL code inverse-conversion and descrambling, and after the read data has been outputted to the hard disk controller 44, errors are corrected by performing ECC decoding processing by the hard disk controller 44. Then, the read data is subjected to buffering to the buffer memory 42, and transferred to the host 11 from the host interface control unit 38.

Furthermore, in write operation and read operation upon receipt of a write command and a read command, the clearance between the head and the magnetic disk is controlled to be a target value, such as a value on the order of several nanometers, by head heater control using a heater control value set in an adjusting step during a device manufacturing stage.

In the MPU 28 in the control board 14, there is provided an access processing unit 48, a parameter managing unit 50, and an atmospheric pressure monitoring unit 52, as functions implemented by the execution of firmware (control programs). Correspondingly, a parameter table 54 is loaded in the volatile memory 32.

FIG. 2 is a block diagram showing details of functional construction of the MPU 28 in FIG. 1. As shown in FIG. 2, in the access processing unit 48 arranged in the MPU 28, there are provided functions of: write processing unit 55, a read processing unit 56, a write verify processing unit 58, and a write verify control unit 60.

Upon receipt of a write command from the host 11, the write processing unit 55 performs processing for writing a write data in a target sector position in a target track in a magnetic disk, the target sector position having being specified by command decoding. At this time, a write clearance of the head with respect to the magnetic disk is controlled to become an optimum value by heater energization control.

Upon receipt of a read command from the host 11, the read processing unit 56 reads out the data from the target sector in the target track in the magnetic disk, the target sector having being obtained by command decoding. At this time, a read clearance of the head with respect to the magnetic disk is controlled to become an optimum value by heater energization control.

Upon receipt of a write request from the host 11, the write verify processing unit 58 reads the data to determine whether an error is present by the read processing unit 56, immediately after having written the data in the magnetic disk by the write processing unit 55. When a read error is present, the write verify processing unit 58 performs write verify for correcting the data by rewrite processing.

In accordance with determination based on a detection result of a drive current in the spindle motor, the write verify control unit 60 validates the function of the write verify processing unit 58. In the present embodiment, when the current environment is determined to be a reduced atmospheric pressure environment by the atmospheric pressure reduction determination unit 70 in the atmospheric pressure monitoring unit 52, the write verify control unit 60 validates the function of the write verify processing unit 58.

When it is determined that error is no longer present, the write verify processing unit 58 takes the control value at that time as a subsequent heater control value for the write processing unit 55 and the write verify control unit 60.

A heater control value managing unit 62 is provided in the atmospheric pressure monitoring unit 52. The heater control value managing unit 62 registers a heater control value for setting the clearance of the head to a predetermined target value with the parameter table 54 at the manufacturing stage, for example, at a shipping test to thereby manage the heater control value. And during write operation or read operation, the heater control value managing unit 62 reads out a corresponding control value from the parameter table 54 to control the clearance.

FIG. 3A is a representation showing a heater control value table 54-1 in the parameter table 54 subjected to registry management by the spindle motor drive current detection unit 64 in FIG. 2.

In FIG. 3A, the parameter table heater control value table 54-1 registers heater control values separately divided into head numbers HH1 to HH4. In the present embodiment, two kinds of heater control values are registered: base heater control values (first heater control values) B and adjustment heater control values (second heater control values) R.

The base heater control values B are input data with respect to a D/A converter for setting power to be supplied to the heater of the head during write operation and read operation. On the other hand, the adjustment heater control values R are input data with respect to the D/A converter for setting power to be supplied in addition to the base heater control value B, to the heater during preheating period other than write operation period and during read operation.

In this embodiment, since four head numbers HH1 to HH4 are provided, the base heater control values B1 to B4 are registered as base heater control values, and R1 to R4 are registered as adjustment heater control values.

Referring back to FIG. 2, during write operation, from a sector position behind a target sector by a predetermined set number of sectors, the write processing unit 55 provided in the MPU 28 preheats the heater through heater energization, and taking herein the head number HH1 in the heater control value table 54-1 as an example, the write processing unit 55 preheats the heater by the heater control value (B1+R1) obtained by adding the base heater control value B1 and the adjustment heater control value R1. When the target sector has been reached, the write processing unit 55 switches the energization to energization by only the base heater control value B1, and writes data in the magnetic disk while controlling the clearance during write operation to be a target value.

During write operation, due to the heating of the recording element by a writing current, a heater heating amount corresponding to the adjustment heater control value R1 is added, which ensures substantially an identical clearance to the clearance obtained by the preheating by the heater energization with the control value (B1+R1).

On the other hand, during read operation, the read processing unit 56 preheats the heater through the heater energization by the heater control value (B1+R1) obtained by adding the base heater control value B1 and the adjustment heater control value R1, from the sector position behind the target sector by the set number of sectors. And when a target sector has been reached, the read processing unit 56 maintains the same control value (B1+R1), and reads out the data in the magnetic disk while controlling the clearance during write operation to be the target value during read operation.

The atmospheric pressure monitoring unit 52 includes functions of: the spindle motor drive current detection unit 64, the temperature detection unit 66, the correction unit 68, and the atmospheric pressure reduction determination unit 70. The atmospheric pressure monitoring unit 52 takes particular note of the relationship between the spindle motor drive current and the atmospheric pressure. The relationship is that as the atmospheric pressure decreases, the load resistance decreases depending on the air density when a number of revolutions of the magnetic disk is constant. The atmospheric pressure monitoring unit 52 monitors the spindle motor drive current when the device starts operating, and determines whether the current environment is a reduced atmospheric pressure environment. When the current environment is a reduced atmospheric pressure environment, the atmospheric pressure monitoring unit 52 switches the write operation performed up to now by the write processing unit 55 to write verify operation by the write verify processing unit 58.

That is, when the device starts to be used immediately after the spindle motor has been started, and during operation of the device, the spindle motor drive current detection unit 64 detects the spindle motor drive current I at the time of the determination of atmospheric pressure decrease set for each definite time interval. The temperature detection unit 66 detects temperature T in the device incorporating the spindle motor, likewise at the time of the determination of atmospheric pressure decrease. The spindle motor drive current detection unit 64 monitors a value of a driving current flowing through the spindle motor.

Also, at the time of the determination of atmospheric pressure decrease, the spindle motor drive current detection unit 64 detects a drive current for the spindle motor 16 in a state where the rotary actuators 20 for moving the heads 24-1 and 24-2 shown in FIG. 1 to arbitrary positions of the magnetic disks 22-1 and 22-2 are fixed to predetermined specific positions, for example, outermost system regions in the magnetic disks. In this manner, by always fixing the rotary actuators 20 at the determined positions when detecting a drive current for the spindle motor 16, the degree of influence of wind pressure to the magnetic disks upon the drive current measured value is made the same for each time, thereby preventing variations in the detected value of drive current.

The correction unit 68 corrects the drive current I detected by the spindle motor drive current detection unit 64 to a drive current at a predetermined reference temperature $T_o$, for example, an ordinary temperature $T_o=30°$ C. in the device, based on the device temperature T detected by the temperature detection unit 66.

This is because the drive current for the spindle motor significantly varies depending on a usage temperature. By performing the above-described temperature correction, the drive current varying in accordance with an atmospheric pressure can be correctly detected without depending temperature.

Specifically, the correction unit 68 holds a temperature correction factor K1 for temperature change of spindle motor drive current measured at the shipping test (here, the temperature correction factor K1 may also be an designed value), and corrects the drive current I detected by the spindle motor drive current detection unit 64 to a value of a drive current at the predetermined reference temperature T, based on a device temperature T detected by the temperature detection unit 66, the reference temperature $T_o$, and the temperature correction factor K1.

The correction unit 68 may perform correction for variations in a source voltage in addition to the temperature correction of the spindle motor drive current. The correction of drive current for variations in the source voltage by the correction unit 68 is performed as follows: when a shipping test is performed, the source voltage the correction unit 68 determines a correction factor K2 of the spindle motor drive current with respect to variations in the source voltage and holds the correction factor K2; then, the correction unit 68 corrects the temperature-corrected drive current I that has been detected by the spindle motor drive current detection unit 64 to a value of a drive current at a predetermined reference source voltage $V_o$, on the basis of the source voltage V, the reference source voltage $V_o$, and the correction factor K2 detected when the current environment has been determined to be a reduced atmospheric pressure environment.

The atmospheric pressure reduction determination unit 70 determines, based on the drive current I corrected by the correction unit 68, whether the current environment is a reduced atmospheric pressure environment. For example, the atmospheric pressure reduction determination unit 70 presets a spindle motor drive current in a usage atmosphere, such as a predetermined altitude of 5 km for example, and the reference temperature $T_o=30°$ C., as a reduced atmospheric pressure threshold value Ith for determining that the current atmosphere is a reduced atmospheric pressure environment. If the drive current I corrected by the correction unit 68 is lower than the reduced atmospheric pressure threshold value Ith, the atmospheric pressure reduction determination unit 70 determines that the current atmosphere is a reduced atmospheric pressure environment.

When the current environment is determined to be a reduced atmospheric pressure environment, the write verify control unit 60 in the access processing unit 48 validates the function of the write verify processing unit 58, and the write verify processing unit 58 operate to thereby set a verify mode. Then, upon receipt of a write command from the host, immediately after having written data in the magnetic disk by the write processing unit 55, the atmospheric pressure reduction determination unit 70 reads the data recorded in the magnetic disk, and performs write verify for determining whether an error is present.

The temperature correction factor K1, the source voltage correction factor K2, and the reduced atmospheric pressure threshold value Ith used in the correction unit 68 provided in the atmospheric pressure monitoring unit 52, and the atmospheric pressure reduction determination unit 70 are registered with the atmospheric pressure monitoring table 54-2 in the parameter table 54 to thereby be managed.

Figure 4:
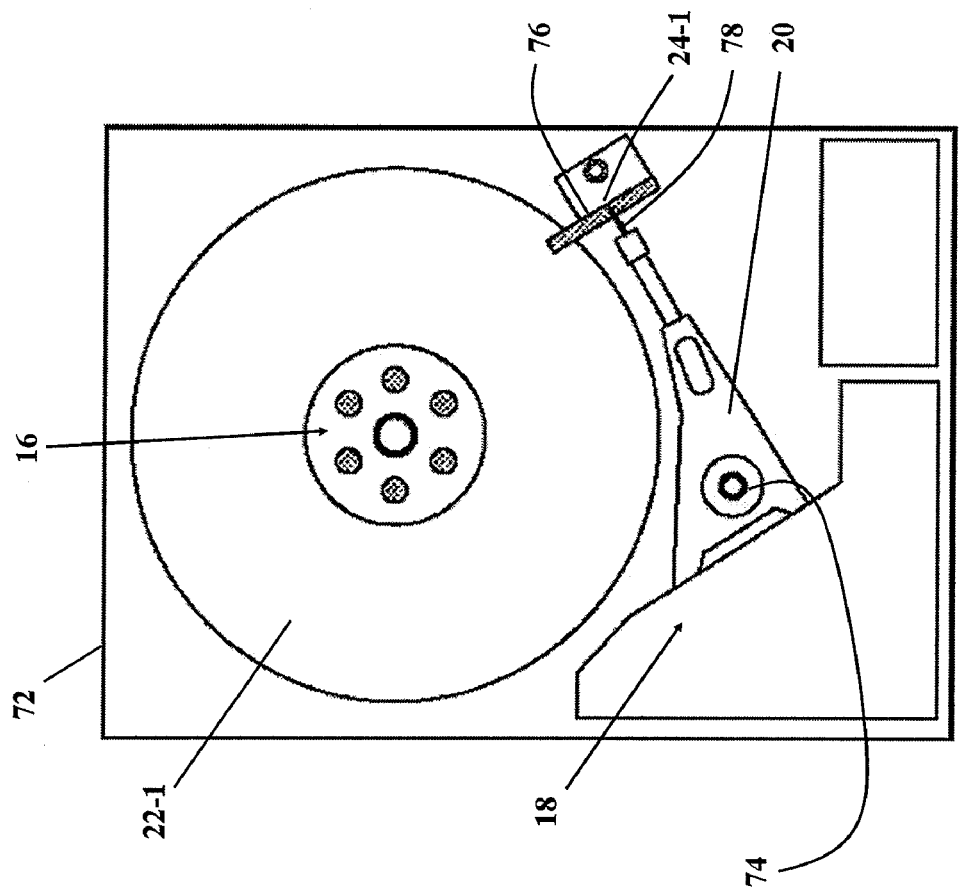
FIG. 4 is a diagram showing an inner structure of a magnetic disk device according to the present embodiment.

FIG. 4 is a diagram showing an inner structure of a magnetic disk device according to the present embodiment. As shown in FIG. 4, the magnetic disk device according to the present embodiment has, on the base 72, the magnetic disks 22-1 and 22-2 rotated at a constant speed by the spindle motor 16.

With respect to the magnetic disks 22-1 and 22-2, there are provided the rotary actuators 20 rotatably supported by the pivot 74. The rotary actuator 20 has a head 24-1 at the front end of a suspension 78 mounted on its arm front end side. A coil provided oppositely to the arm is fixed to the base 72, and turnably disposed between upper and lower yokes each equipped with permanent magnet, This coil and the stator constitutes a voice coil motor 18. In a stop state before power-on, the head 24-1 is located at and locked by a ramp load mechanism 76.

Figure 5:
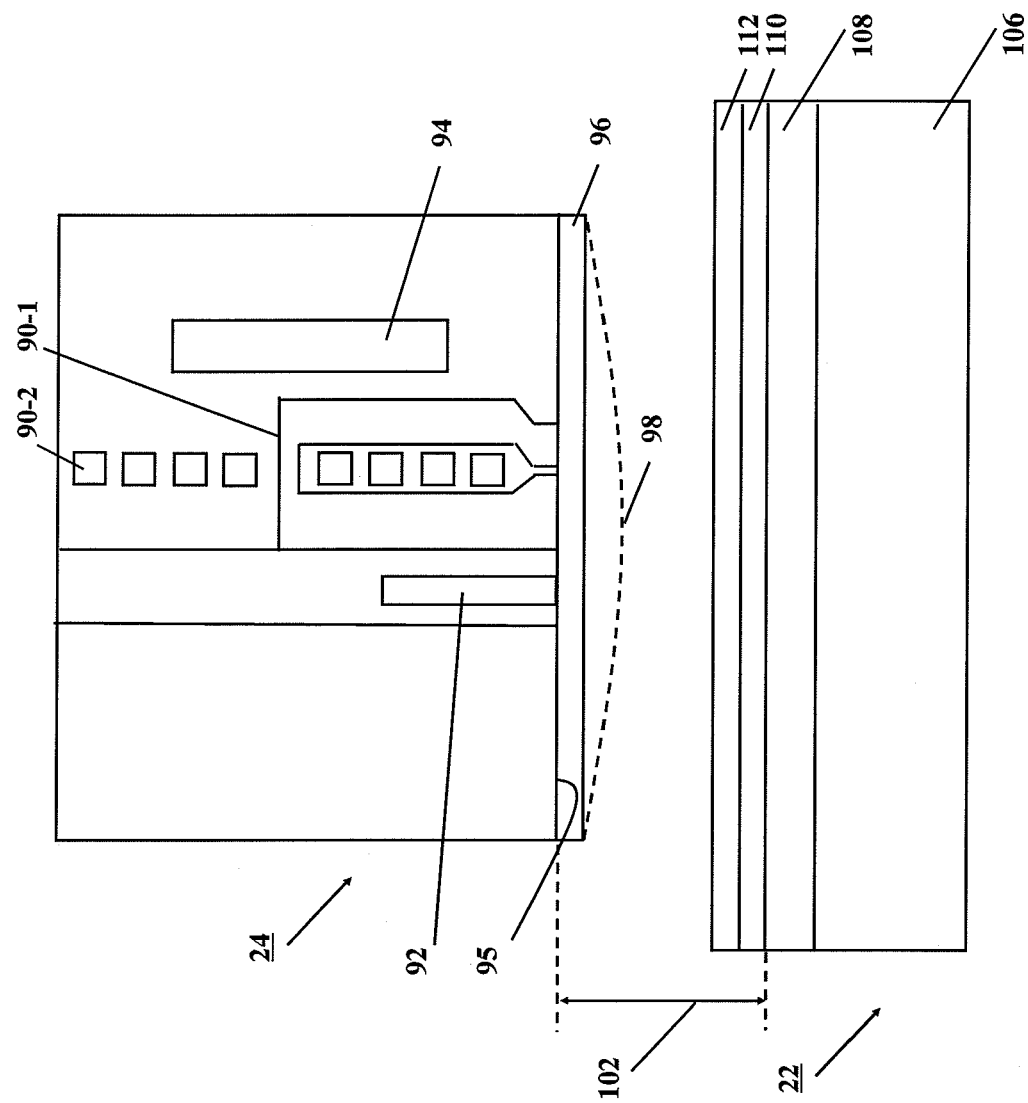
FIG. 5 is a diagram showing details of a head structure in the present embodiment.

FIG. 5 is a diagram showing details of the head structure in the present embodiment. As shown in FIG. 5, as recording elements, the head 24 has a recording core 90-1 and a recording coil 90-2 provided inside an insulator made of ceramic or the like. A reading element 92 is provided adjacently on the left side of these recording elements. A surface of the head 24 facing to the magnetic disk 22 is an air bearing surface (ABS) 95 functioning as a floating surface, and has a protective film 96 formed thereover.

On the other hand, the magnetic disk 22 includes a substrate 106, a recording film 108 formed on the substrate 106, a protective film 110 formed over the recording film 108, and further a lubricant 112 provided over the protective film 110. Besides, a heater 94 is arranged adjacently to the recording core 90-1 constituting one of the recording elements of the head 24.

By heating the heater 94 through energization, the ABS serving as the floating surface of the head 24 protrudes toward the magnetic disk 22 due to thermal expansion to thereby form a protrusion part 98. The clearance 102 between the head 24 and the magnetic disk 22 is defined as a clearance from the lower end of the reading element 92 to the recording film 108 in the magnetic disk 22.

Figure 6:
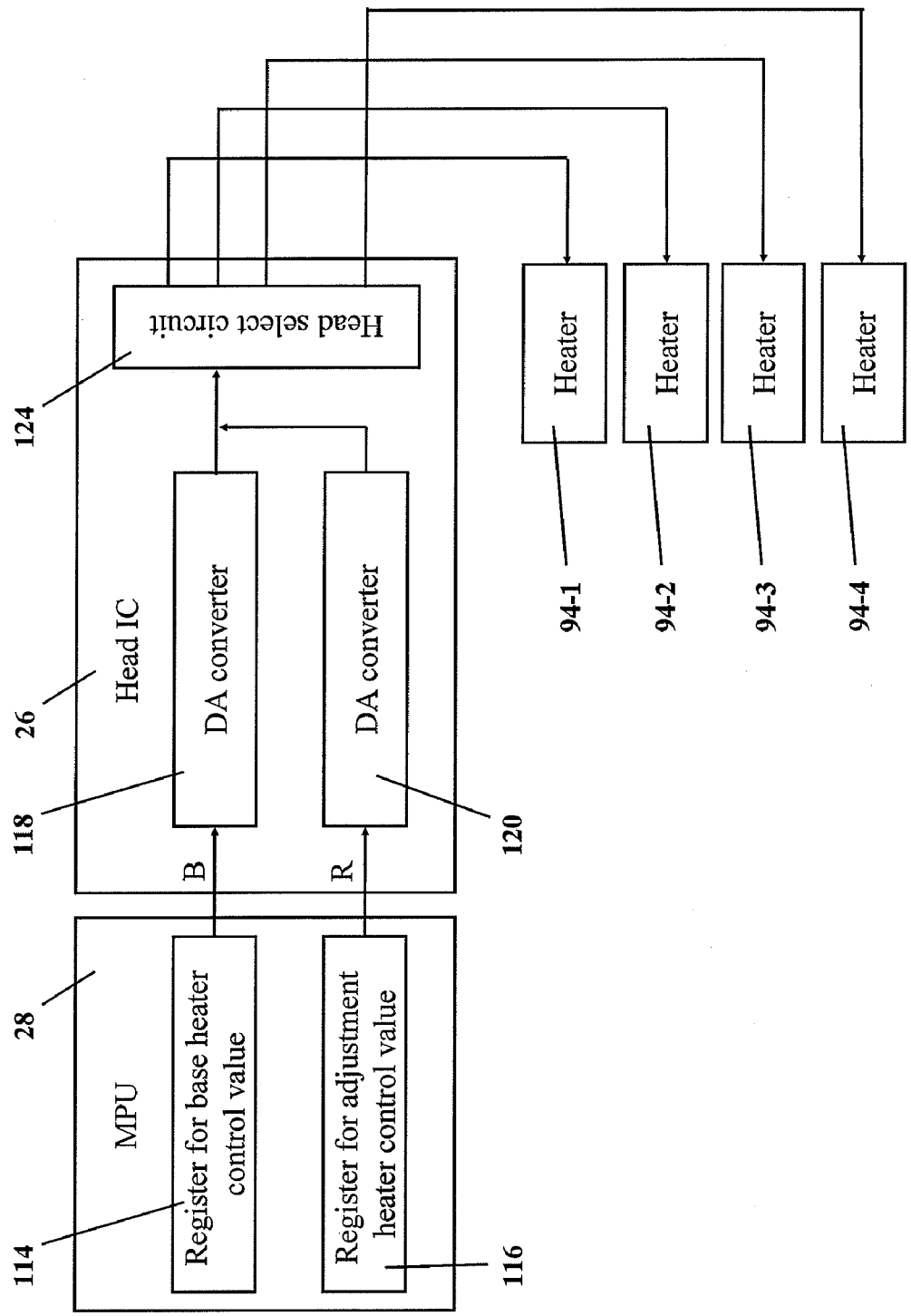
FIG. 6 is a block diagram of a heater control system.

FIG. 6 is a block diagram of a heater control system. As shown in FIG. 6, MPU 28 has a register 114 for base heater control value, and a register 116 for adjustment heater control value. During write operation or read operation, by the designation of head numbers from the parameter table 54-1 shown in FIG. 3A, corresponding base heater control value B and adjustment heater control value R are read out, and, respectively, set into the register 114 for base heater control value and the register 116 for adjustment heater control value.

The head IC 26 has D/A converters 118 and 120. The head IC 26 converts each of the heater control value B and R set into the register 114 for base heater control value and the register 116 for adjustment heater control value into an analog signal, and add them together. Then, via a head select circuit 124, the head IC 26 supplies power to any of the heaters 94-1 to 94-4 corresponding to the head selected at that time, and protrudes the head through thermal expansion, to thereby control the clearance, which is a clearance between the head and the medium surface, to be a preset target clearance.

Here, during preheat and during read operation, heater control values B and R, respectively, are set into the register 114 for base heater control value and the register 116 for adjustment heater control value, and hence, the heater control value in this case becomes (B+R).

In contrast, during write operation, only the heater control value B is set into the register 114 for base heater control value, and the heater control value R in the register 116 for adjustment heater control value is zero, that is, heater control by only the base heater control value B is performed. In actuality, besides a thermal expansion by the base heater control value B, a thermal expansion by recording currents is added.

Figure 7:
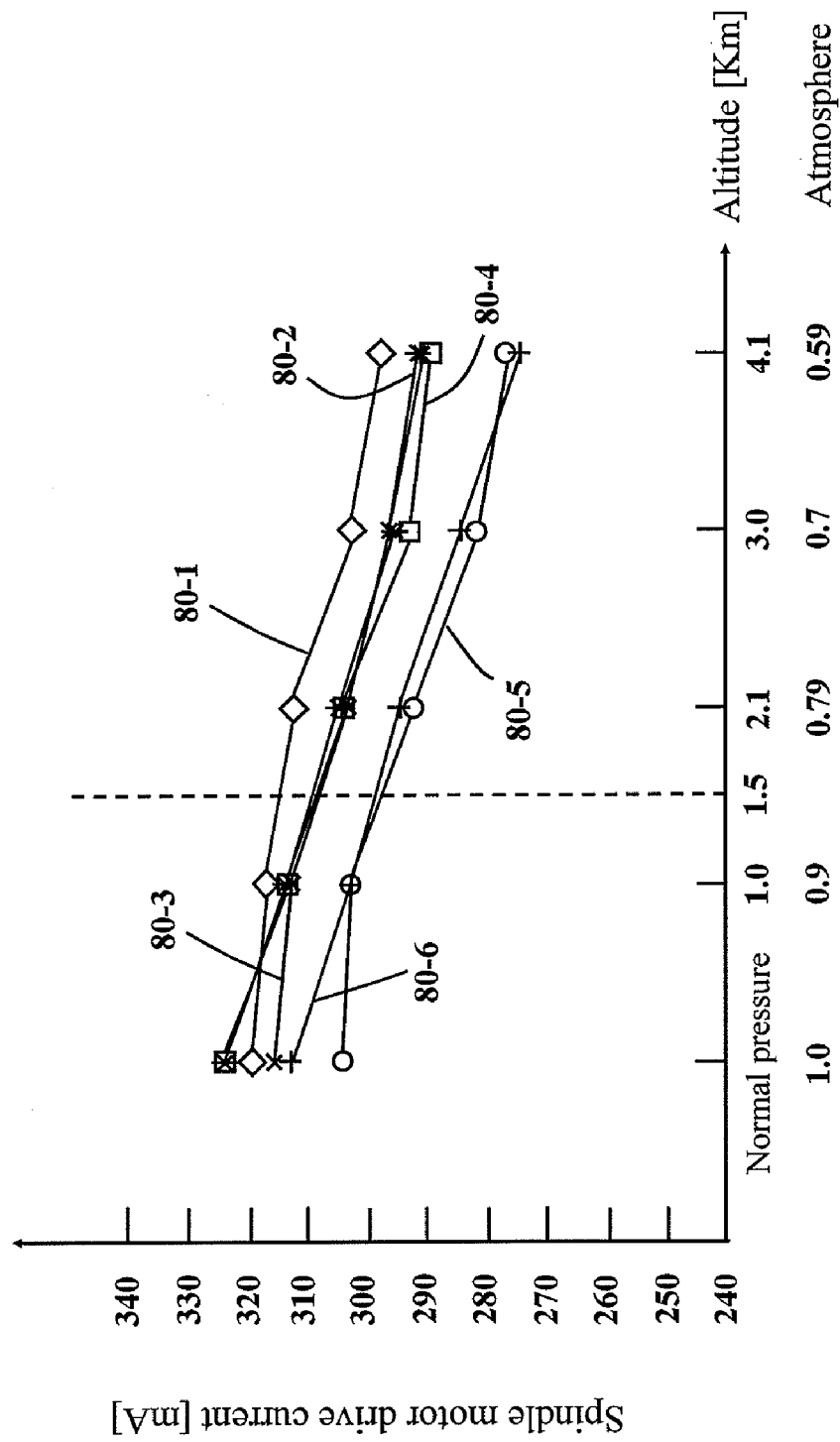
FIG. 7 is a graph showing measured results of spindle motor drive currents, depending on atmosphere.

FIG. 7 is a graph showing measured results of spindle motor drive currents, depending on atmosphere. In FIG. 7, the horizontal axis designates the altitude and the vertical axis designates the spindle motor drive current.

In the horizontal axis designating altitude, taking the altitude 0 km as an ordinary atmospheric pressure, spindle motor drive currents were measured under atmospheric pressure environments at altitudes of 1 km, 2.1 km, 3.0 km, and 4.1 km. Here, the altitudes shown in the horizontal axis correspond to their respective atmospheric pressures. The atmospheric pressure 1800 hPs at altitude 0 km is assumed to be 1 atmospheric pressure. It is known that the atmospheric pressure decreases as the altitude increases, and that the atmospheric pressure decreases about by half at altitude 5 km. Therefore, in the altitudes shown in the horizontal axis, approximately, the ordinary pressure corresponds to 1 atm, 1 km corresponds to 0.9 atm, 2.1 km corresponds to 0.79 atm, 3 km corresponds to 0.7 atm, and 4.1 km corresponds to 0.59 atm.

The spindle motor drive currents depending on atmospheric pressure as shown in FIG. 7 were measured regarding five magnetic disks in these examples, and characteristic curves 80-1 to 80-6 were obtained. Regarding the characteristic curves 80-1 to 80-6 of all devices, the spindle motor drive current substantially linearly decreases with the increase in altitude from the ordinary atmospheric pressure, that is, with decrease in atmospheric pressure.

With respect to the changes in spindle motor drive currents that have been depended on the atmospheric pressure regarding the present embodiment, e.g., the altitude 1.5 km is set as a threshold value for determining whether the current environment is a reduced atmospheric pressure environment, and when the spindle motor drive current has decreased lower than a threshold current given by the above-described threshold altitude 1.5 km, it is determined that the current environment is a reduced atmospheric pressure environment.

A concrete way of determining a threshold current is to determine the differential currents ΔI1 to ΔI6 between the spindle motor drive currents at the ordinary atmospheric pressure 0 km in the characteristic curves 80-1 to 80-6 of the plurality of devices illustrated in FIG. 7, and the spindle motor drive currents at the threshold altitude 1.5 km, and to determine an average differential current ΔI therebetween, to thereby take this ΔI as an offset current with respect to a changed portion due to atmospheric pressure decrease.

When the offset current ΔI with respect to the changed portion due to atmospheric pressure decrease can be calculated in this manner from the characteristic curves depending on atmospheric pressure, spindle motor drive currents under an ordinary atmospheric pressure and an ordinary temperature are measured as reference currents $I_o$ during shipping tests of the respective magnetic disks, and thereupon, the reduced atmosphere pressure threshold value Ith is calculates as $$Ith = I_o - \Delta I$$

This threshold value Ith is registered with the atmospheric pressure monitoring table 54-2 shown in FIG. 3B and is managed.

In the examples in FIG. 7, 1.5 km has been set as threshold altitude for determining whether the current environment is a reduced atmospheric pressure environment. However, regarding this threshold altitude, an appropriate threshold altitude can be set as required, to thereby determine a reduced atmospheric pressure threshold value Ith for each device by determining the offset current ΔI with respect to a changed portion due to atmospheric pressure decrease, corresponding to the threshold altitude.

Figure 8:
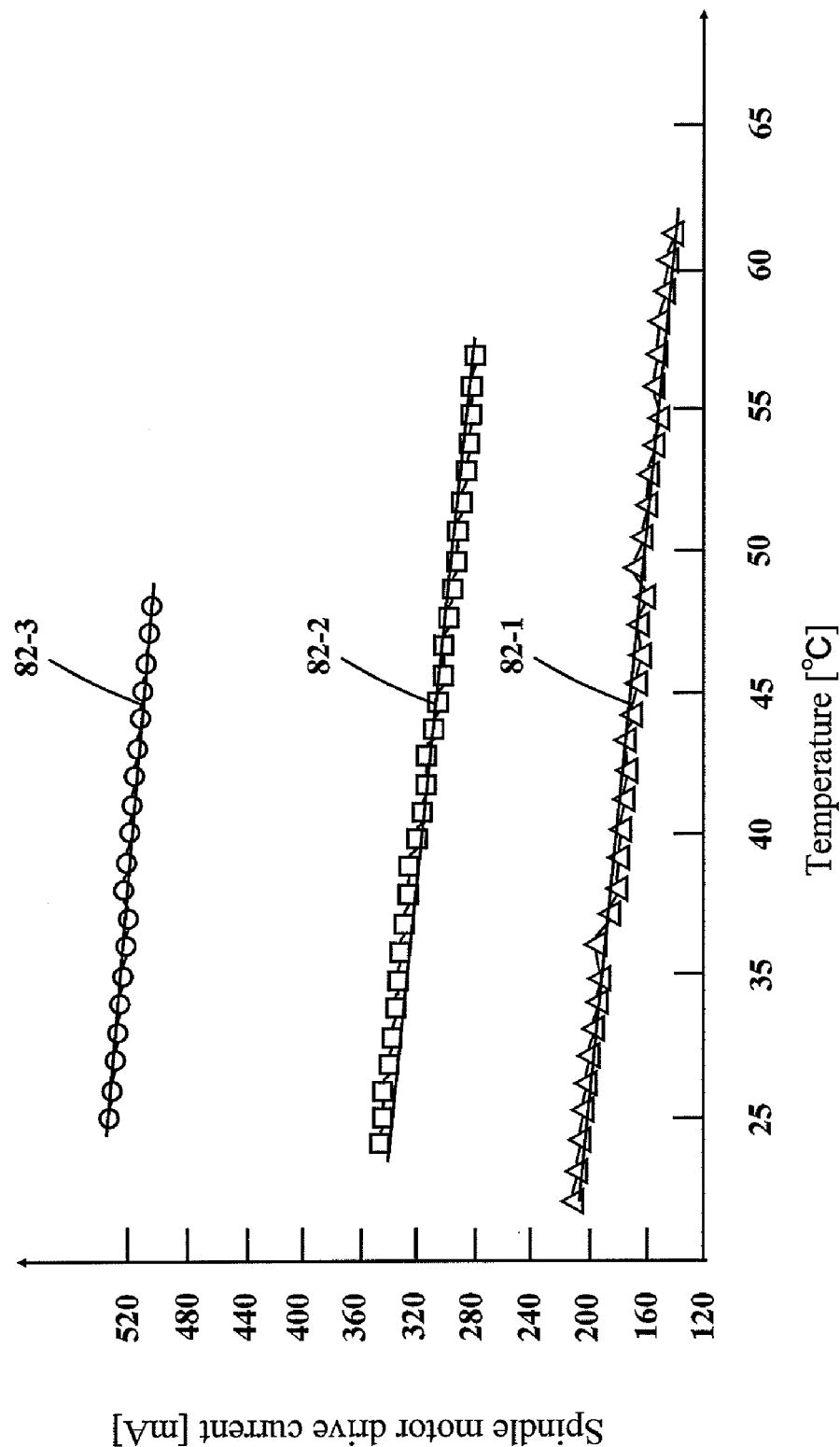
FIG. 8 is a graph showing measured results of spindle motor drive currents, depending on temperature.

FIG. 8 is a graph showing measured results of spindle motor drive currents, depending on temperature. In FIG. 8, the horizontal axis designates the temperature inside the device and the vertical axis designates the spindle motor drive current.

The characteristic curve 82-1 is a characteristic curve of spindle motor driving one magnetic disk, the characteristic curve 82-2 is a characteristic curve of the spindle motor driving two magnetic disks, and further the characteristic curve 82-3 is a characteristic curve of the spindle motor driving four magnetic disks.

As can be seen from these characteristic curves 82-1 to 82-3, the spindle motor drive current increases with the increase in the number of magnetic disks, since the more the number of magnetic disks driven by the spindle motor, the more increases the load.

Regarding each of the characteristic curves 82-1 to 82-3 of the spindle motor drive current driving magnetic disks different in the number, as temperature decreases, the friction of bearing etc. in the drive system increases, and hence the drive current increases. In other words, as temperature increases, the friction of the drive system decreases, and hence the drive current decreases.

Here, taking the characteristic curve 82-2 for two magnetic disks as an example, the drive current is about 340 mA at 30° C., which is an ordinary temperature inside the device, and the drive current falls to about 260 mA when temperature rises to 50° C. That is, the temperature rise of 20° C. causes a current change of about 80 mA.

On the other hand, regarding the atmospheric pressure dependency of the spindle motor drive current shown in FIG. 7, for example, the current change from the ordinary atmospheric pressure to the threshold altitude 1.5 km is 10 to 15 mA. It is clear from the results that the spindle motor drive current is higher in temperature dependency than in atmospheric pressure dependency. Hence, in order to accurately determine the atmospheric pressure dependency of spindle motor drive current, it is necessary to detect the temperature inside the device to perform a temperature correction without fail.

Figure 9:
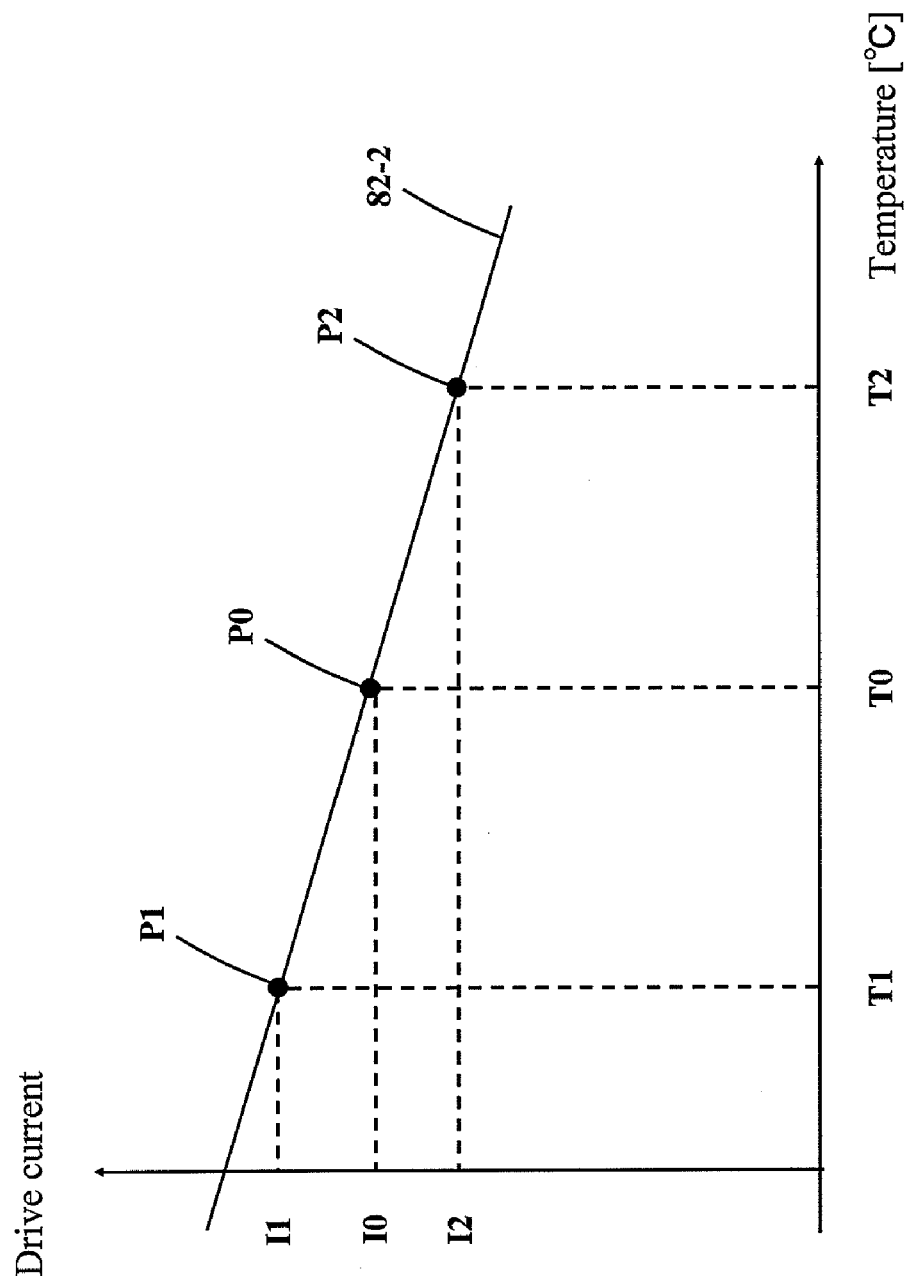
FIG. 9 is a graph showing how a temperature correction factor K1 for the spindle motor drive current to be determined.

FIG. 9 is a graph showing how the temperature correction factor K1 for the spindle motor drive current to be determined in the present embodiment. FIG. 9 illustrates characteristic curve of the drive current driving two magnetic disks shown in FIG. 8. As a reference temperature $T_o$ in the characteristic curve 82-2, the ordinary temperature $T_o=30°$ C. in the device under ordinary atmospheric pressure condition is set, and a drive current given by a point $P_0$ on the characteristic curve 82-2 is set as resonance circuit $I_0$. When attempting to determine whether the current environment is a reduced atmospheric pressure environment, the determination is made upon correcting the measured drive current to the reference temperature $T_o$.

Next, the temperature correction factor K1 is determined from the characteristic curve 82-2.

To this end, a lower temperature T1 is set with respect to the reference temperature $T_o$, to thereby determine a drive current I1 at a point P1 (corresponding to the temperature T1) on the characteristic curve 82-2. Also, a higher temperature T2 is set, to thereby determine a drive current I2 given by a point P2 (corresponding to the temperature T2) on the characteristic curve 82-2.

After having determined the temperatures T1 and T2, and the drive currents I1 and I2 corresponding to the points P1 and P2 on the characteristic curve 82-2, the temperature correction factor K1 is calculated by the following equation:

$$K1 = (I2 - I1)/(T2 - T1) \text{ [amperes/° C.]}$$

The temperature correction factor K1 thus calculated is registered with the atmospheric pressure monitoring table 54-2 in FIG. 3B and managed.

Figure 10:
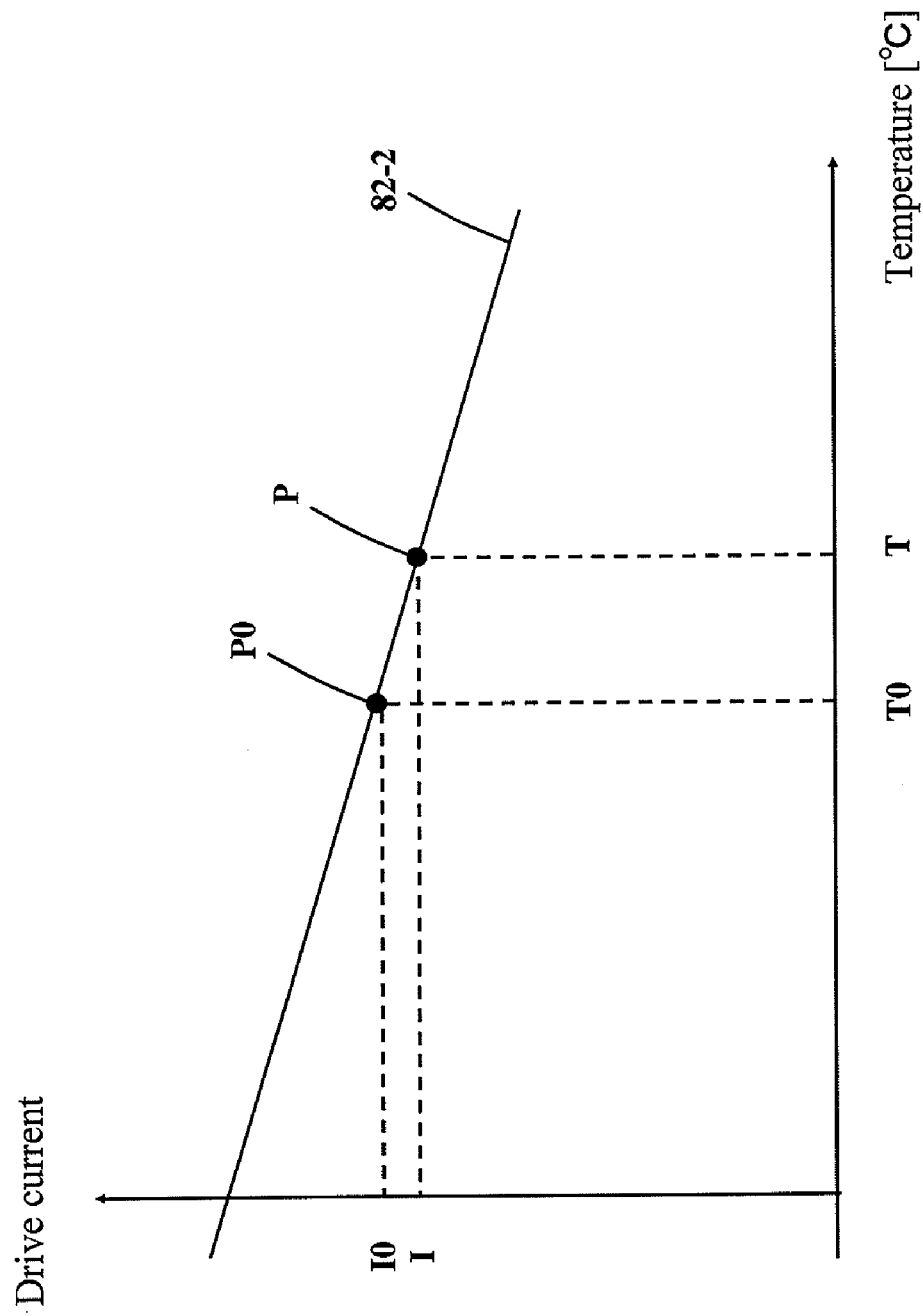
FIG. 10 is a graph showing correction processing for the spindle motor drive current, using the temperature correction factor K1 obtained from FIG. 9.

FIG. 10 is a graph showing correction processing for the spindle motor drive current, using the temperature correction factor K1 obtained from FIG. 9. In FIG. 10, let the drive current detected when a reduction in atmospheric pressure has been determined be I, and let the temperature inside the device be T, then the measure point in this case becomes a point P on the characteristic curve 82-2. So, a measured current I at a measured temperature T is corrected to the current $I_0$ at the point $P_0$ at the reference temperature $T_0$ by the following equation.

$$I_0 = I + K1(T - T_0) \quad (1)$$

Figure 11:
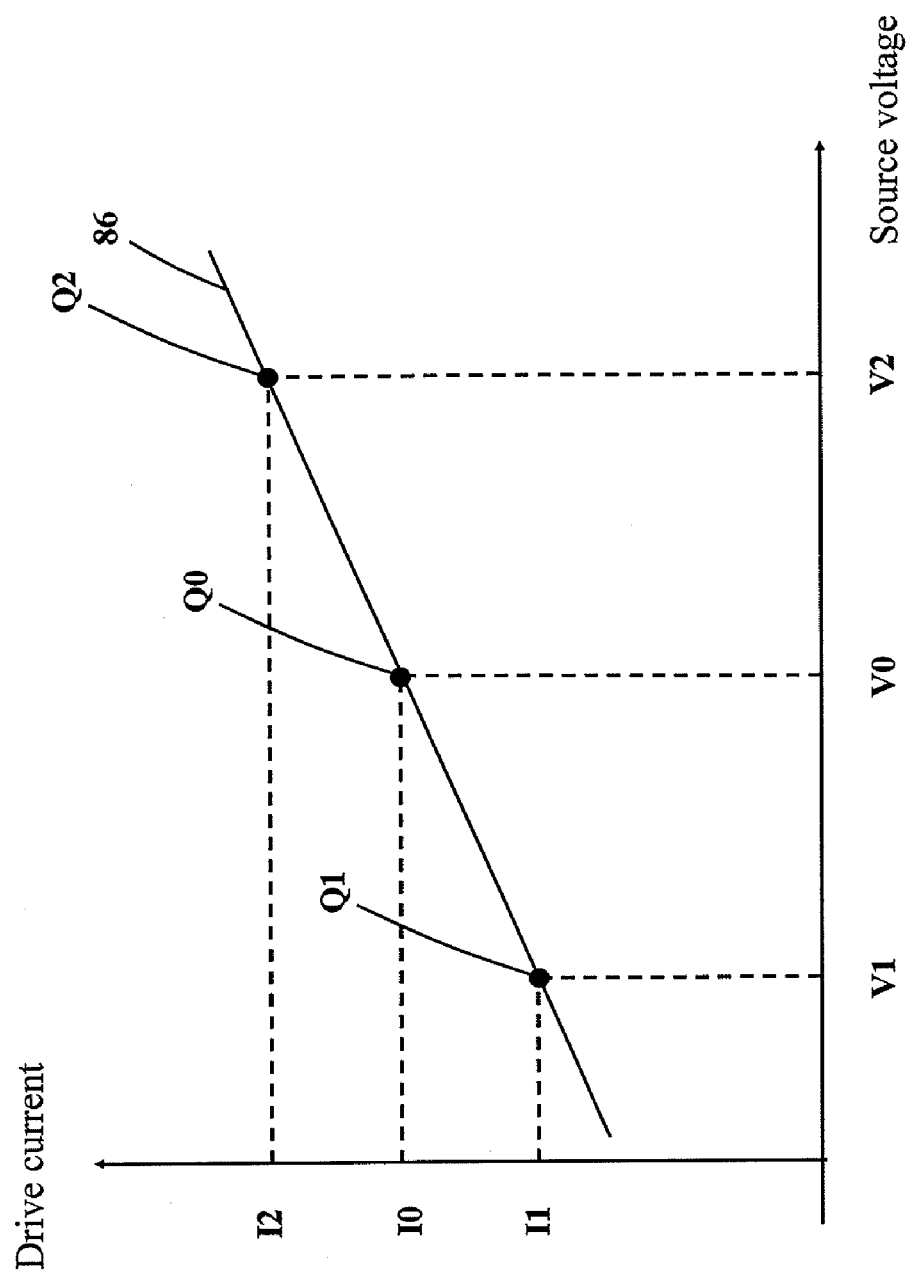
FIG. 11 is a graph showing how a source voltage correction factor K2 to be determined from measured results of spindle motor drive currents, depending on the source voltage.

FIG. 11 is a graph showing how a source voltage correction factor K2 to be determined from measured results of spindle motor drive currents, depending on the source voltage. In the present embodiment, since the drive current for determining an atmospheric pressure reduction suffers from influences by variations in the source voltage of the magnetic disk device besides the temperature inside the device, it is necessary to perform correction with respect to variations in the source voltage in order to detect the atmospheric pressure dependency with high degree of accuracy.

In FIG. 11, measured results of spindle motor drive currents with respect to variations in source voltage measured under ordinary temperature and ordinary atmospheric pressure conditions during shipping tests, as characteristic curve 86. As is evident from the characteristic curve 86, there is a proportional relationship in which the spindle motor drive current substantially linearly increases with the increase of the source voltage.

Therefore, for example, 5 V is taken as a source reference voltage $V_0$, and in this case, the drive current corresponding to a point $Q_0$ on the characteristic curve 86 is determined as reference current $I_0$.

Furthermore, in order to determine the source voltage correction factor K2 from the characteristic curve 86, a lower voltage V1 and a higher voltage V2 are each set, and the drive current I1 at a point Q1 (corresponding to the source voltage V1) and the drive current I2 at a point Q2 (corresponding to the source voltage V2) on the characteristic curve 86 are determined. Then, the source voltage correction factor K2 is obtained by the following equation:

$$K2 = (I2 - I1)/(V2 - V1) \text{ [amperes/volt]}$$

The source voltage correction factor K2 thus calculated is registered with the atmospheric pressure monitoring table 54-2 in FIG. 3B and managed.

Figure 12:
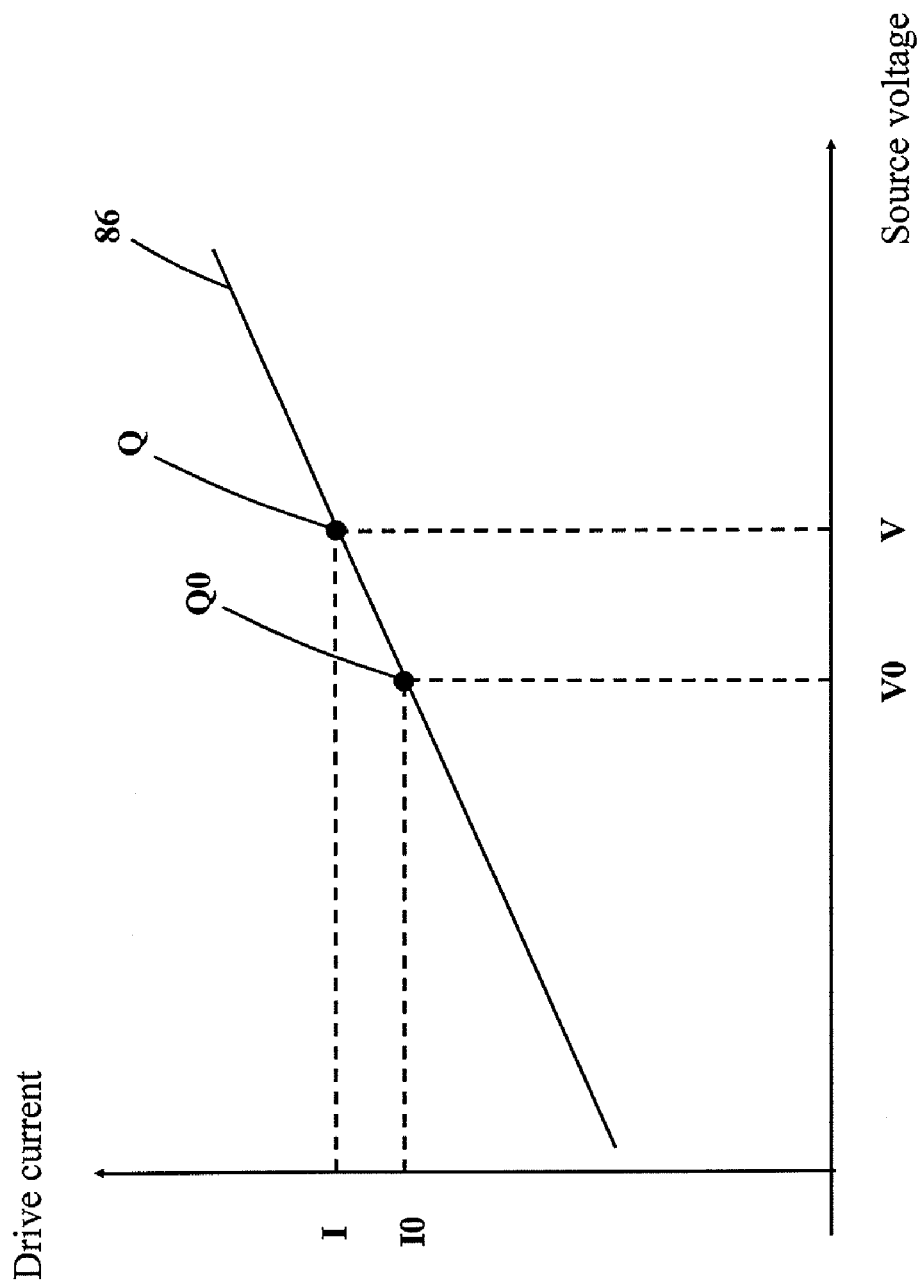
FIG. 12 is a graph showing correction processing for the spindle motor drive current, using the source voltage correction factor K2 obtained from FIG. 11.

FIG. 12 is a graph showing correction processing for the spindle motor drive current, using the source voltage correction factor K2 obtained from FIG. 11. In FIG. 12, let the drive current detected when a reduction in atmospheric pressure has been determined be I, and let the source voltage simultaneously detected be V, then the measure point in this case becomes a point Q.

So, the measured drive current I of the source voltage V is corrected to the current $I_0$ at the point $Q_0$ corresponding to source reference voltage $V_0$ by the following equation, using the source voltage correction factor K2.

$$I_0 = I + K2(V - V_0) \quad (2)$$

Regarding the correction with respect to the spindle motor drive current depending on the source voltage as shown in FIGS. 11 and 12, when variations in source voltage of the magnetic disk device is negligibly low, there is no need for correction.

Figure 13B:
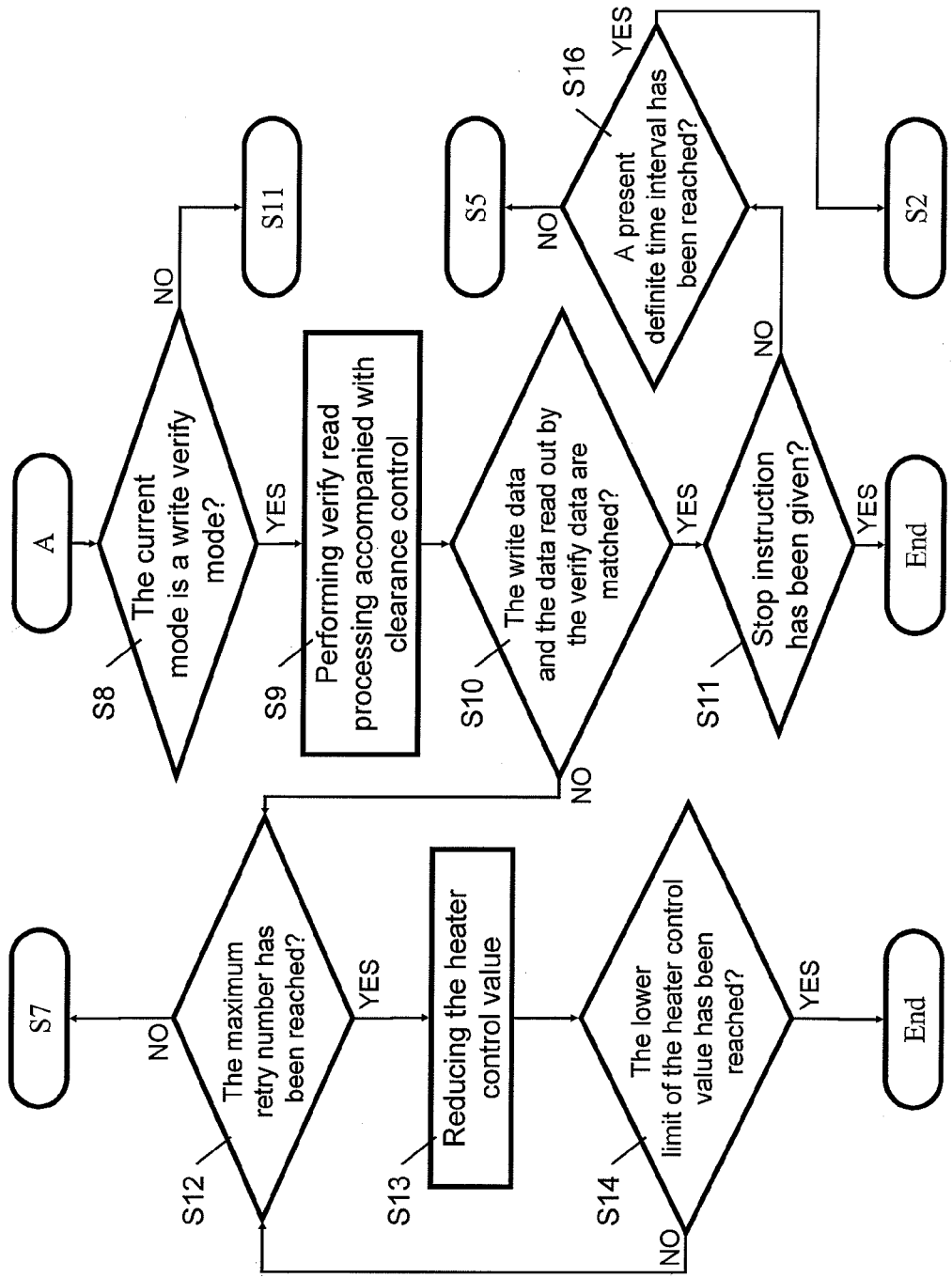

FIGS. 13A and 13B are flowcharts showing control processing in the present embodiment including clearance control by the heater. Descriptions hereinafter are made with reference to FIGS. 1 and 2.

As shown in FIGS. 13A and 13B, when the magnetic disk device 10 according to the present embodiment performs start processing in step S1 upon receipt of power-on accompanying the usage start of the host 11, the process advances to step S2, and, in a state immediately after the start, measurement processing for a spindle motor drive current is performed. Simultaneously, a temperature correction and, as required, a source voltage correction are performed with respect to the measured value of spindle motor drive current.

Next, the process advances to step S3, and the spindle motor drive current measured in step S2 is compared with the reduced atmospheric pressure threshold value Ith read from the atmospheric pressure monitoring table 54-2, and it is determined whether the current environment is a reduced atmospheric pressure environment.

If the spindle motor drive current is lower than the reduced atmospheric pressure threshold value Ith, the current environment is determined to be a reduced atmospheric pressure environment, and the process advances to step S4 to set the write verify mode. Next, in step S5, command reception from the host is monitored, and upon receipt of the command, the process advances to step S6 to check whether the received command is a write command.

If the received command is a write command, the process advances to step S7, and write processing accompanied with clearance control by the heater incorporated in the head is performed by the write processing unit 55 in FIG. 2. Upon completion of the write processing, in step S8, it is checked whether the current mode is the write verify mode. At this time, if the write verify mode has already been set I step 4, the process advances to step S9, and verify read processing accompanied with clearance control is performed by the read processing unit 56 in FIG. 2.

The term here "setting of write verify mode" means that the write processing unit 55 validates the function of the write verify processing unit 58.

Upon completion of the verify read processing, in step S10, write data is collated with data read out by the verify read. If they are matched in the collation, it is determined that the data has been normally written under a reduced atmospheric pressure environment, and processing with respect to the write command is completed. If stop instruction has not been given in step S11, it is checked in step S16 whether this is timing to measure a spindle motor drive current. If not, the process returns to step S5 to wait for a next command reception.

On the other hand, if an error occurs in step S10 because the write data and the data obtained by the verify read are mismatched in the collation, the process advances to step S12 to determine whether the maximum retry number has been reached. If not, the write verify processing in steps S7 to S9 is again performed.

If an error reoccurs in the execution of such a write verify processing, the write verify processing is repeated until the maximum retry number has been reached in step 12, and then the process advances to step S13 to perform control for increasing the clearance by a definite amount, that is, control for decreasing the heater control value by a definite amount. Specifically, the heater control is performed for reducing the adjustment heater control value R registered with the heater control value table 54-1 in FIG. 3A, by a definite amount ΔR. A controller changes a flying height of the head by controlling the space control element in accordance with a monitored driving current.

After having reduced the heater control value in step S13, it is checked in step S14 whether the lower limit of the heater control value has been reached, and if not, the write verify processing in steps S7 to S9 is again performed.

Due to the write verify accompanying the increase in the clearance by heater control, even if the head should have collided at random against the magnetic disk under a reduced atmospheric pressure to thereby cause errors, gradually increasing the clearance by the heater control prevents contacts between the head and the magnetic disk and eliminates the occurrence of errors, thereby allowing data to be reliably written into the magnetic disk even under a reduced atmospheric pressure.

Regarding the measurement timing for spindle motor drive current in step S16, after the device has started, it is monitored whether a preset definite time interval has been reached, and when the definite time interval has been reached, the process advances to step S2. In step S2, the measurement processing for spindle motor drive current is again performed, and in step S3, it is determined whether the current atmosphere is a reduced atmospheric pressure environment.

As a result, a reduction in atmospheric pressure can be properly determined not only when the magnetic disk starts but also during operation thereof after the start, and under a reduced atmospheric pressure, reliable writing of data into the magnetic disk by setting of the verify mode can be ensured.

FIG. 14 is a flowchart showing measurement processing of spindle motor derive current in step S2 in FIG. 13A. As shown in FIG. 14, regarding the measurement processing of spindle motor drive current, in step S1, the rotary actuator 20 shown in FIG. 1 is fixed to a predetermined position, for example, the head is positioned to the outermost region of the magnetic disk and fixed there, whereby it is possible to always keep constant the influence of wind pressure to the magnetic disks upon the drive current measured values, the wind pressure depending on the position of the actuator.

Next, in step S2, drive current for the spindle motor is read by an A/D converter, and in step S3, detected temperature inside the enclosure is read. Then in step S4, on the basis of the drive current I read in step S2 and the detected temperature T read in step S3, drive current measured value I is temperature-corrected to measured value at the ordinary temperature (reference temperature) by the above-described equation (2). Thereafter, the process returns to a main routine in FIGS. 13A and 13B, and in step S3, based on the comparison of the temperature-corrected measured value with the reduced atmospheric pressure threshold value Ith, it is determined whether the current environment is a reduced atmospheric pressure environment.

FIG. 15 is a flowchart showing other measurement processing of spindle motor derive current in step S2 in FIG. 13A. This measurement processing is characterized in that correction of the spindle motor drive current is performed by means of temperature and source voltage.

In the measurement processing in FIG. 15, the source voltage V is read in step S4, and the drive current measured value is temperature-corrected in step S5. Then in step S6, the temperature-corrected measured value is corrected in accordance with a source voltage changed portion, using the equation (2). The rest is the same as the temperature correction in FIG. 10.

Figure 16A:
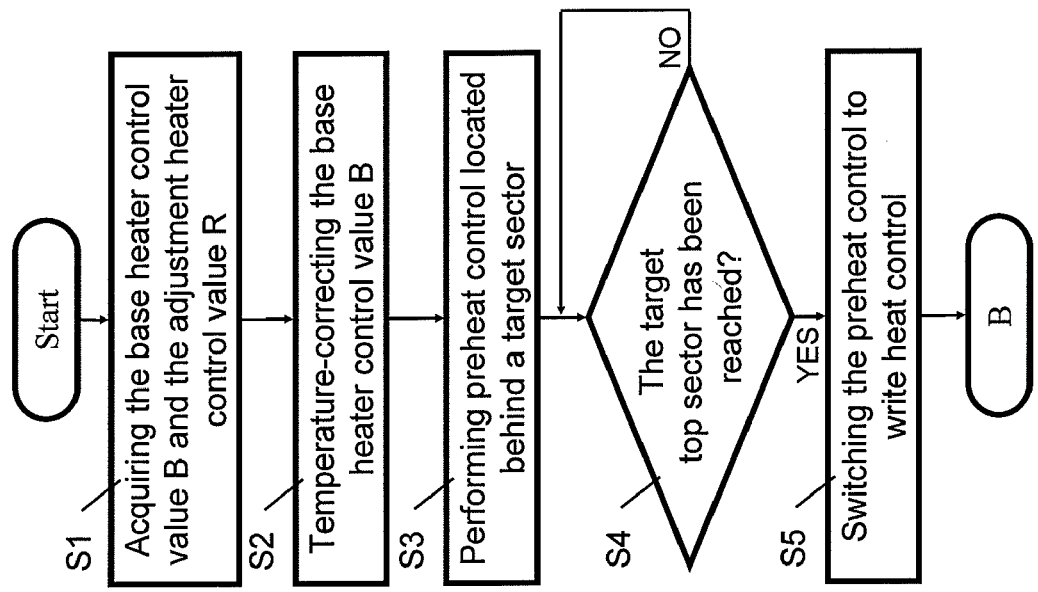
FIGS. 16A and 16B are flowcharts showing write processing.
Figure 16B:
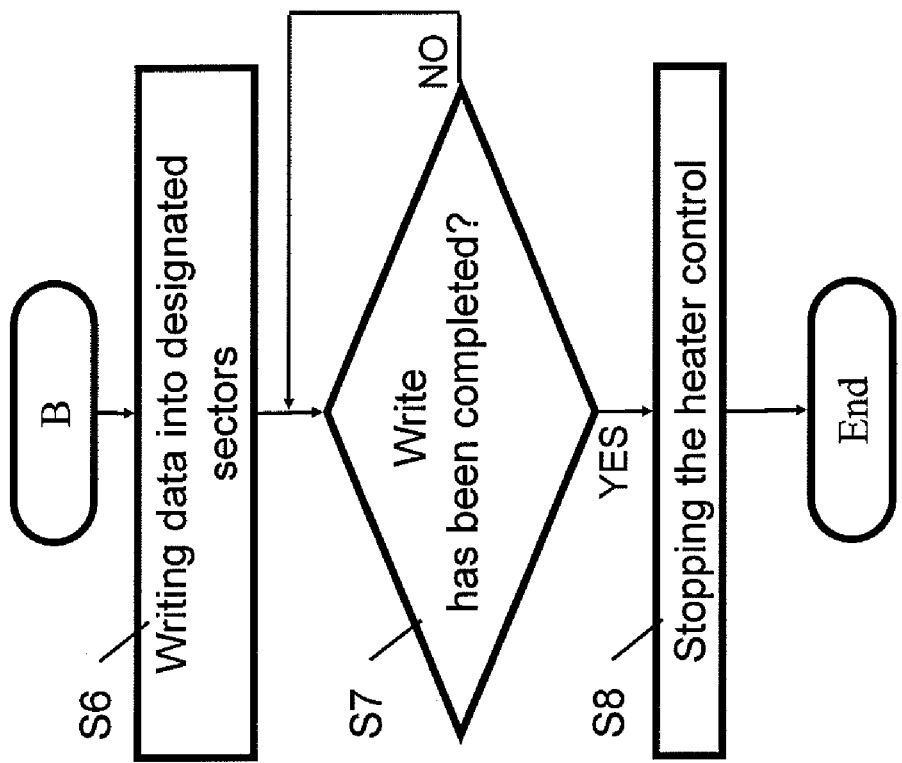

FIGS. 16A and 16B are flowcharts showing write processing accompanied with clearance control in step S7 in FIG. 13A, according to the present embodiment, wherein the write processing is performed by the write processing unit 55 in FIG. 2. As shown in FIGS. 16A and 16B, the write processing unit 55 firstly decodes a write command in step S, and after has recognized a target track, acquires the base heater control value B and the adjustment heater control value R by designating the head and zone, referring to the heater control value table 54-1 in FIG. 3A.

Next, in step S2, the write processing unit 55 temperature-corrects the base heater control value B that has been acquired. This temperature correction is performed as follows: since the heater control value at the ordinary temperature 30° C. inside the device has been registered in the heater control value table 54-1 in FIG. 3A, the write processing unit 55 reads the current temperature T inside the device, and calculates the temperature difference with respect to the ordinary temperature $\Delta T$ as $$\Delta T = T - 30° C.$$

By multiplying this by the conversion factor for converting into a heater control value per unit temperature, the write processing unit 55 determines temperature correction value Bt, and temperature-corrects B as $$B = B + Bt$$

Here, when the temperature inside the device is higher than 30° C., the temperature correction value Bt takes a negative value, and the base heater control value B is corrected to a value that is lower by the temperature correction value Bt. On the other hand, when the temperature inside the device is lower than 30° C., the temperature correction value Bt takes a positive value, and the base heater control value B is corrected to a value that is higher by the temperature correction value Bt.

Next, in step S3, the write processing unit 55 performs preheat control from a sector located behind a target sector by a set number of sectors with the heat control value (B+R). Then the write processing unit 55 checks whether the current sector is a target top sector, and if it determines that the target top sector has been reached, switches the preheat control to write heat control by the base heater control value B. In step S6, the write processing unit 55 writes data into designated sectors, and if it determines in step S7 that write has been completed, it stops the heater control in step S8.

FIGS. 17A and 17B are flowcharts showing read processing accompanied with clearance control in step S15 in FIG. 13A, according to the present embodiment, wherein the read processing is performed by the read processing unit 56 in FIG. 2. As shown in FIGS. 17A and 17B, the read processing unit 5 firstly decodes a read command in step S1, and after has recognized a target track, acquires the base heater control value B and the adjustment heater control value R by designating the head and zone, referring to the heater control value table 54-1 in FIG. 3A.

Next, in step S2, the read processing unit 56 temperature-corrects the base heater control value B that has been acquired. This temperature correction is performed as follows: since the heater control value at the ordinary temperature 30° C. inside the device has been registered in the heater control value table 54-1 in FIG. 3A, the write processing unit 55 reads the current temperature T inside the device, and calculates the temperature difference with respect to the ordinary temperature $\Delta T$ as $$\Delta T = T - 30° C.$$

By multiplying this by the conversion factor for converting into a heater control value per unit temperature, the write processing unit 55 determines temperature correction value Bt, and temperature-corrects B as $$B = B + Bt$$

Next, in step S3, the read processing unit 56 performs preheat control from a sector located behind a target sector by a set number of sectors with the heat control value (B+R). Then, if the read processing unit 56 determines that the target top sector has been reached, the process advances to step S5, and the read processing unit 56 starts read continuously using the heat control value (B+R) without changing it. Then, if the read processing unit 56 determines in step S6 that the read has been completed, the read processing unit 56 stops the heater control in step S7.

Furthermore, the write verify processing accompanied with clearance control by the write verify processing unit 58 in FIG. 2 is a combination of the write processing in FIGS. 16A and 16B, and the read processing in FIGS. 17A and 17B. That is, immediately after steps S1 to S8 in the write processing in FIGS. 16A and 16B have been performed, the write processing is switched to the read processing in FIGS. 17A and 17B, steps S3 to S7 are performed skipping steps S1 and S2.

Figure 18:
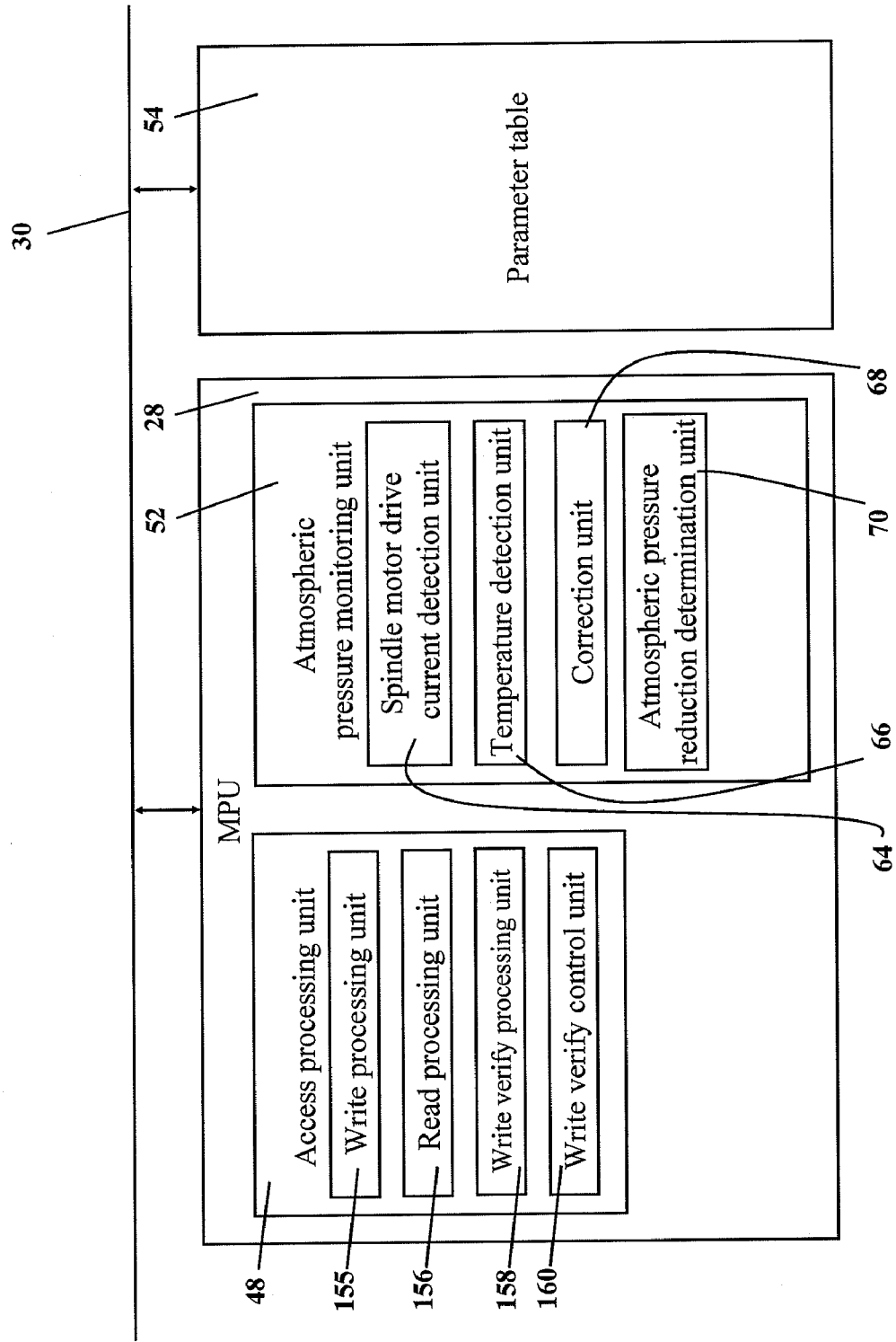
FIG. 18 is a block diagram showing details of functional construction of the MPU in the embodiment in FIG. 1 without a heater for clearance control.

FIG. 18 is a block diagram showing details of functional construction of the MPU in the embodiment in FIG. 1 without a heater for clearance control. As shown in FIG. 18, the MPU 28 has the access processing unit 48 and the atmospheric pressure monitoring unit 52.

The access processing unit 48 includes a write processing unit 155, a read processing unit 156, a write verify processing unit 158, and a write verify control unit 160. In this embodiment, the heads 24-1 and 24-2 shown in FIG. 1 has not the heater 94 shown in FIG. 5, so the clearance adjustment by heater control cannot be performed.

As a result, the write processing unit 155 having the access processing unit 48 writes data into the magnetic disk upon receipt of a write command from the host 11. On the other hand, the read processing unit 156 reads data from the magnetic disk upon receipt of a read command from the host 11.

Moreover, when the write verify processing unit 158 receives the write command from the host 11 in a state where it is determined, by the atmospheric pressure reduction determination unit 70 provided in the atmospheric pressure monitoring unit 52, that the current atmosphere is a reduced atmospheric pressure environment, it reads data immediately after having written the data into the magnetic disk by the write processing unit 155, to thereby perform write verify processing for determine whether an error is present.

Upon receipt of a write request, the write verify processing unit 158 reads data immediately after having written the data into the magnetic disk by the write processing unit 155, and determines whether an error is present. If an error is present, the write verify processing unit 158 performs write verify processing for correcting the data by rewrite processing.

In accordance with determination based on the detected result of drive current in the spindle motor, the write verify control unit 160 validates the function of the write verify processing unit 158. In the present embodiment, it is determined, by the atmospheric pressure reduction determination unit 70 in the atmospheric pressure monitoring unit 52, that the current environment is a reduced atmospheric pressure environment, the write verify control unit 160 validates the function of the write verify processing unit 158.

The atmospheric pressure monitoring unit 52 includes the spindle motor drive current detection unit 64, the temperature detection unit 66, the correction unit 68, and the atmospheric pressure reduction determination unit 70. The construction and the functions of these units are the same as those shown in the atmospheric pressure monitoring unit 52 in FIG. 2. Furthermore, the parameter table 54 has the atmospheric pressure monitoring table 54-2 shown in FIG. 3A, but has not the heater control value table 54-1 in FIG. 3A.

Figure 19A:
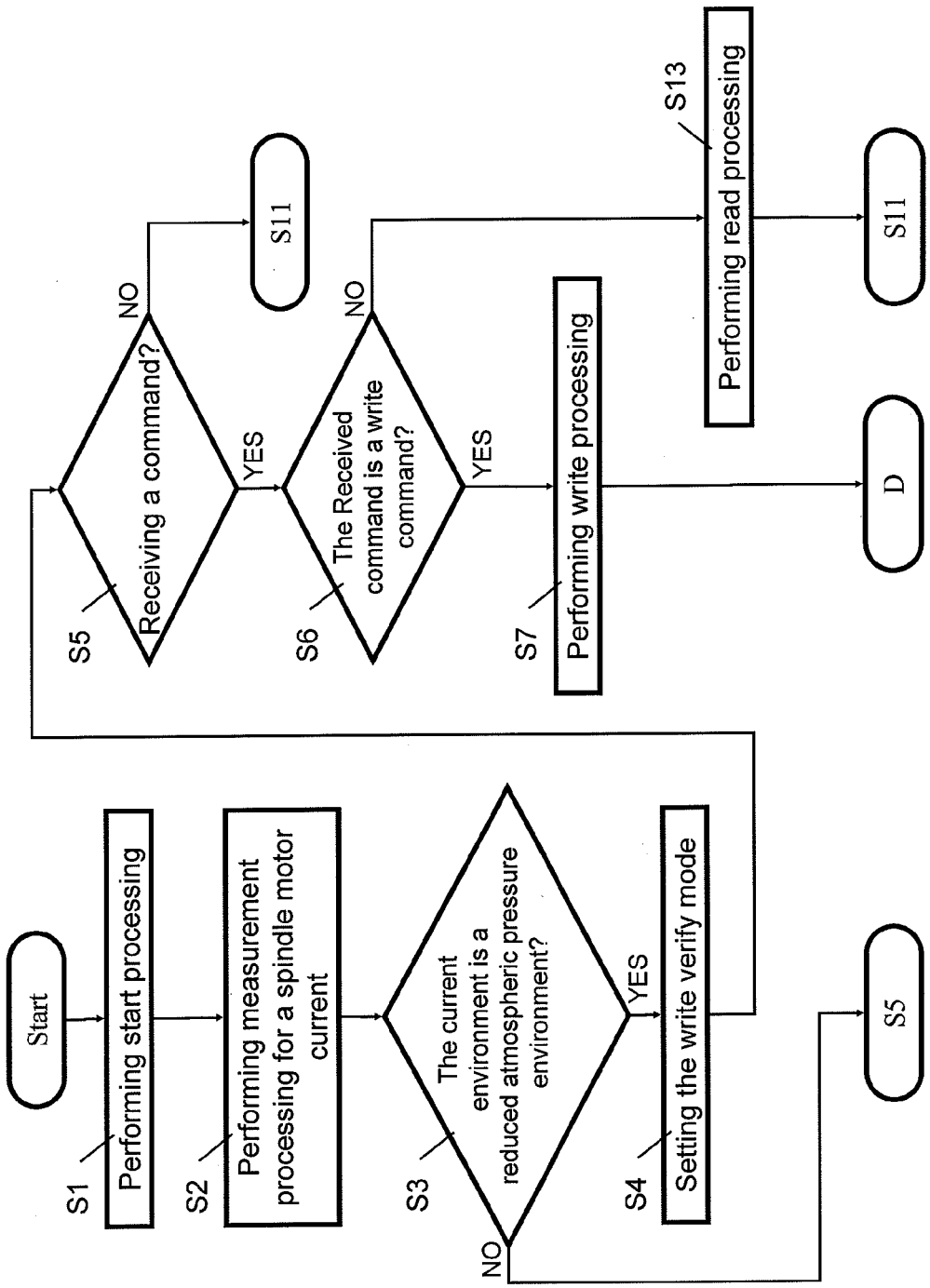
FIGS. 19A and 19B are block diagram showing control processing in the embodiment in FIG. 18 without the heater for clearance control.
Figure 19B:
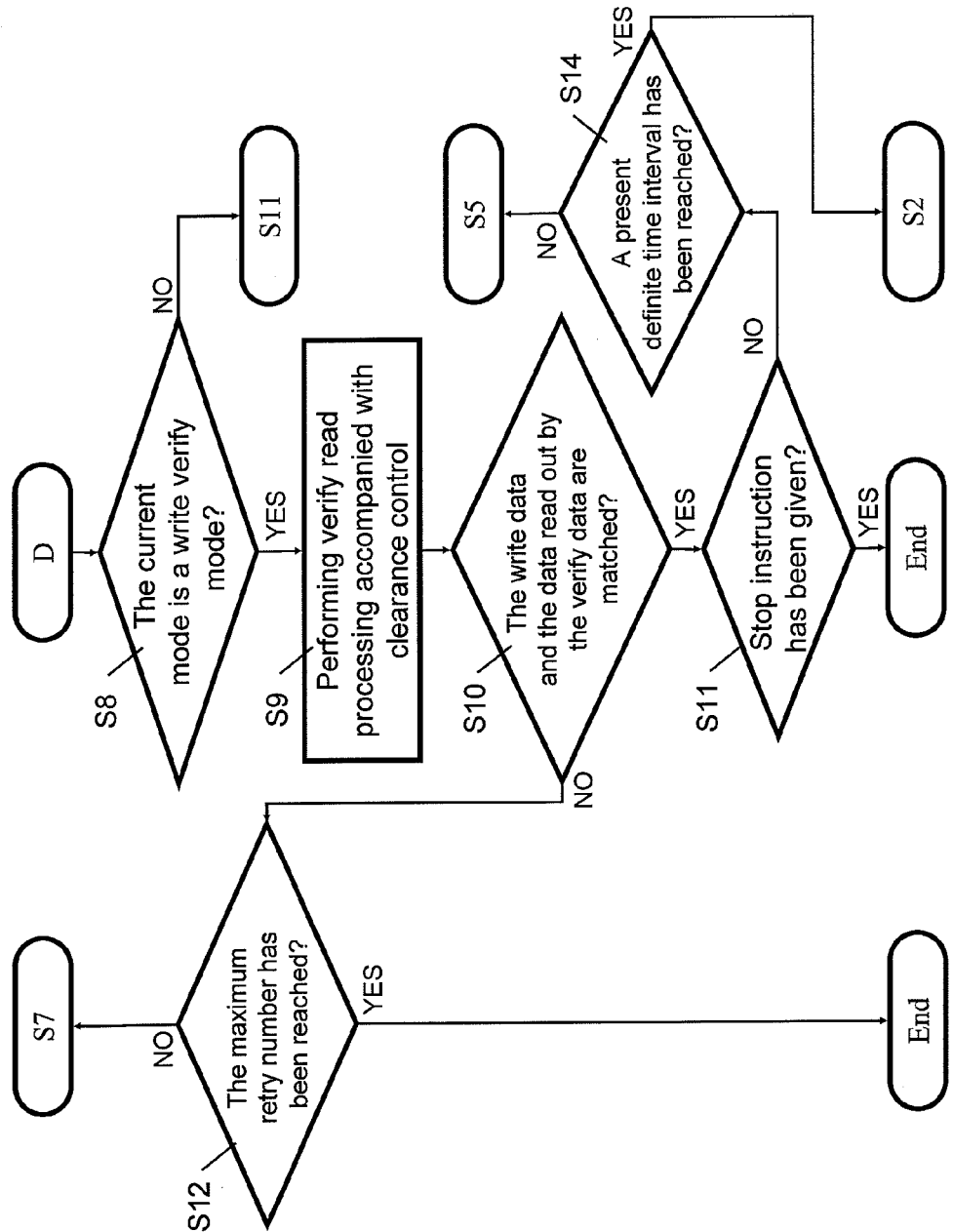

FIGS. 19A and 19B are block diagram showing control processing in the embodiment in FIG. 18 without the heater for clearance control. In FIGS. 19A and 19B, upon the power-on of the magnetic disk device accompanying the power-on of the host 11, start processing is performed accompanying the power-on in step S1.

Then in step S2, measurement processing of spindle motor drive current is performed. Details of the measurement processing of spindle motor drive current is the same as those shown in the flowchart in FIG. 14 or FIG. 15.

A drive current measured in step S3 is compared with the reduced atmospheric pressure threshold value Ith read out from the atmospheric pressure monitoring table 54-2 in FIG. 3B. If the measured current is lower than the reduced atmospheric pressure threshold value Ith, the current environment is determined to be a reduced atmospheric pressure environment, the write verify mode is set in step S4.

If command reception from the host 11 is determined in step S5, it is determined in step S6 whether the received command is a write command, and if so, the step advances to step S7 to write data into the magnetic disk medium by the write processing unit 155.

Then in step S8, if setting of the write verify mode is determined, the process advances to step S9, and data that has been written most recently, is read out from the magnetic disk by the read processing unit 156. Then in step S10, the read data is collated with write data held in a buffer or the like, and if they are matched in the collation, it is determined that the data has been normally written under a reduced atmospheric pressure environment, and a series of processes with respect to the write command is completed.

On the other hand, if, in step S10, an error occurs due to mismatch in the collation between the write data and the read data, the process advances to step S12. If the maximum retry number has not been reached, the process returns to step S7, and write verify processing is again performed by steps S7 to S9.

When write verify processing is repeated some times under such a reduced atmospheric pressure environment, the head makes contact with the magnetic disk at random and performs jumping, so that the clearance increases at timing of writing into the target sector, and writing performance decreases, resulting in read errors. Nevertheless, in the course of the repetition of write verify processing some more times, the clearance returns to a normal state at the timing of writing into the target sector, thereby eliminating the read errors. Thus, even under a reduced atmospheric pressure environment, the repetition of write verify processing allows normal data writing.

Therefore, even in the magnetic disk device without a heater for clearance control, the execution of write verify under a reduced atmospheric pressure environment ensures data writing with respect to the magnetic disk, thereby allowing the prevention of the occurrence of read errors.

The present technique further provides a magnetic disk according to another embodiment, the magnetic disk has a usage environment detection unit that detects the state of a device usage environment, a write verify processing unit that, upon receipt of a write request from a higher-level device, immediately after having written data in the magnetic disk by the write processing unit, reads data to determine, by the read processing unit, whether an error is present, and that, if a read error is present, performs write verify for correcting the data by rewrite processing; and a write verify control unit that validates the function of the write verify processing unit, in accordance with determination based on the detected result of drive current.

Herein, the usage environment detection unit detects an atmospheric pressure as a state of the device usage environment, and when the detection result is that the current usage environment is a reduced atmospheric pressure environment, the write verify processing unit validates the function of the write verify processing unit to thereby processes the request from the higher-level device.

The usage environment detection unit is the atmospheric pressure monitoring unit 52 in FIG. 2, and the write verify processing unit and the write verify control unit, respectively, are the write verify processing unit 58 and the write verify control unit 60 provided in the access processing unit 48 in FIG. 2.

Also, the usage environment detection unit may detect not only an atmospheric pressure as a state of device usage environment, but also temperature inside the device, and when the detected temperature exceeds a threshold temperature to such an extent that read error occurs in the normal write processing, the usage environment detection unit may switch the normal write mode to the write verify mode to thereby process a write request from the higher-level device.

The present technique provides firmware as control programs to be executed by the MPU 28 in the magnetic disk device 10. Regarding the embodiment including heater control, this firmware has the contents shown in the flowcharts in FIG. 13A to FIG. 17B. Regarding the embodiment without heater control, the firmware has the content shown in the flowchart in FIGS. 19A and 19B.

In the above-described embodiments, the heater control in which the base heater control value and the adjustment heater control value are used as heater control values are used in combination, has been taken as an example. However, clearance control may be used in which a single heater control value corresponding to each of the preheat time, the write operation time, and the read operation time.

According to the present technique, by monitoring a spindle motor drive current to thereby detect a change in atmospheric pressure, it is possible to easily predict, without the need for a special censor for detecting atmospheric pressure, that a device usage environment is a reduced atmospheric pressure environment, which causes a decrease of a clearance between the head and the recording medium.

Also, when it has been determined, from a change in spindle motor drive current, that the current environment is a reduced atmospheric pressure environment, upon receipt of a write command from the higher-level device, immediately after having written data in the storage medium, the present storage device reads data to determine whether an error is present. When a read error is present, the present storage device performs write verify for correcting the data by rewrite processing. Since such an environment is prone to cause an error due to a clearance decrease accompanying an atmospheric pressure decrease, ascertaining whether the data is correctly written in the recording medium ensures write processing under a reduced atmospheric pressure environment, and prevents the occurrence of subsequent read errors.

When an error occurs due to an execution of write verify, there is a possibility that the head will make at random contacts with the recording medium owing to the decrease of the clearance. Hence, when a heater for controlling the clearance is incorporated in the head, performing write verify after having increased power supply to the heater on target to increase the clearance allows the prevention of the write operation in a state where the head is in contact with the recording medium, thereby improving the reliability in playback of user data.

The present technique may include appropriate modifications without impairing the object and the advantages thereof. Moreover, the present technique is not limited to the numeric values shown in the above-described embodiments.

What is claimed is:

1. A storage apparatus comprising:
   a motor for rotating a medium;
   a head having a heater, the clearance between the medium and the head being controlled by expansion of the head by the heater;
   a monitor configured to monitor an atmospheric pressure; and
   a controller configured to control the heater in accordance with the atmospheric pressure so as to control the clearance.

2. The storage apparatus of claim 1, wherein the controller validates the control of the heater in accordance with the monitored atmospheric pressured.

3. The storage apparatus of claim 1, wherein the controller disables the control of the heater when the monitored atmospheric pressure is not smaller than a predetermined value.

4. The storage apparatus of claim 1, wherein the controller detects a temperature inside the storage apparatus and corrects the monitored atmospheric pressure in a predetermined reference temperature on the basis of the temperature detected.

5. The storage apparatus of claim 1, further comprising:
   an error detector configured to detect an error by a comparison of data written into the medium and data read out from the medium, wherein
   the controller is configured to control the heater in accordance with the atmospheric pressure so as to control the clearance, when the error is detected.

6. The storage apparatus of claim 1, wherein, when the monitor monitors a decrease in the atmospheric pressure, the controller controls the heater to decrease a temperature of the heater so as to increase the clearance.

7. A method of controlling a heater of a head over a medium in a storage apparatus having a motor for rotating the medium, comprising:
   monitoring a driving current flowing through the motor;
   controlling the heater in accordance with the driving current so as to control a clearance between the medium and the head, the clearance being controlled by expansion of the head by the heater.

8. A storage apparatus comprising:
   a motor for rotating a medium;
   a head having a heater, the clearance between the medium and the head being controlled by expansion of the head by the heater;
   a monitor configured to monitor a driving current flowing through the motor; and
   a controller configured to control the heater in accordance with the driving current so as to control the clearance.

9. The storage apparatus of claim 8, wherein the controller enables the control of the heater in accordance to the monitored driving current.

10. The storage apparatus of claim 8, wherein the controller disables the control of the heater when the monitored atmospheric pressure is not smaller than a predetermined value.

11. The storage apparatus of claim 8, wherein the controller detects a temperature inside the storage apparatus and corrects the monitored pressure in a predetermined reference temperature on the basis of the temperature detected.

12. The storage apparatus of claim 8, further comprising:
an error detector configured to detect an error by a comparison of data written into the medium and data read out from the medium, wherein
the controller is configured to control the heater in accordance with the driving current so as to control the clearance, when the error is detected.

13. The storage apparatus of claim 8, wherein, when the monitor monitors a decrease in the driving current, the controller controls the heater to decrease a temperature of the heater so as to increase the clearance.

* * * * *

UNITED STATES PATENT AND TRADEMARK OFFICE
CERTIFICATE OF CORRECTION

| | |
|---|---|
| PATENT NO. | : 7,808,738 B2 |
| APPLICATION NO. | : 12/212238 |
| DATED | : October 5, 2010 |
| INVENTOR(S) | : Mitsunaga et al. |

It is certified that error appears in the above-identified patent and that said Letters Patent is hereby corrected as shown below:

Claim 2

Col. 18, Line 21     Delete "pressured" and insert --pressure-- in its place.

Signed and Sealed this
Twenty-second Day of February, 2011

David J. Kappos
*Director of the United States Patent and Trademark Office*